(12) United States Patent
Yanagisawa et al.

(10) Patent No.: US 11,073,749 B2
(45) Date of Patent: Jul. 27, 2021

(54) PROJECTION SYSTEM, PROJECTION-TYPE IMAGE DISPLAY APPARATUS, AND IMAGING APPARATUS

(71) Applicant: SEIKO EPSON CORPORATION, Tokyo (JP)

(72) Inventors: Hirotaka Yanagisawa, Azumino (JP); Eiji Morikuni, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/804,430

(22) Filed: Feb. 28, 2020

(65) Prior Publication Data

US 2020/0278595 A1 Sep. 3, 2020

(30) Foreign Application Priority Data

Mar. 1, 2019 (JP) .............................. JP2019-037325

(51) Int. Cl.
*G03B 21/14* (2006.01)
*G03B 21/28* (2006.01)
*G03B 21/10* (2006.01)

(52) U.S. Cl.
CPC ........... *G03B 21/142* (2013.01); *G03B 21/28* (2013.01); *G03B 21/10* (2013.01)

(58) Field of Classification Search
CPC ...... G03B 21/28; G03B 21/53; G03B 21/142; G03B 21/145; G03B 21/147;
(Continued)

(56) References Cited

U.S. PATENT DOCUMENTS

2004/0174611 A1 9/2004 Hatakeyama
2009/0066919 A1* 3/2009 Fujita .................... G03B 21/28
353/98
(Continued)

FOREIGN PATENT DOCUMENTS

JP 2010-020344 A 1/2010
JP 2019-133061 A * 2/2018
JP 2019-133061 A 8/2019

OTHER PUBLICATIONS

Dec. 28, 2020 Office Action Issued in U.S Appl. No. 16/804,533.
(Continued)

*Primary Examiner* — Sultan Chowdhury
(74) *Attorney, Agent, or Firm* — Oliff PLC

(57) ABSTRACT

A projection system has a first optical system and a second optical system arranged on a magnifying side of the first optical system. The projection system forms an intermediate image in a position between a demagnifying-side image formation plane and a magnifying-side image formation plane of the projection system. The second optical system is an optical element having a first transmissive surface, a reflective surface, and a second transmissive surface arranged from a demagnifying side toward the magnifying side. The first transmissive surface and the reflective surface are located at one side with respect to an optical axis. The second transmissive surface is located at another side with respect to the optical axis. The reflective surface has a concavely curved shape. The second transmissive surface has a convexly curved shape protruding toward the magnifying side.

20 Claims, 19 Drawing Sheets

(58) Field of Classification Search
CPC ...... G03B 21/208; G02B 17/00; G02B 17/08; G02B 17/0828; G02B 17/0844; G02B 17/0848; G02B 17/0852; G02B 17/0896; G02B 13/06; G02B 13/16; G02B 13/18; G02B 13/22; G02B 13/0065; G02B 13/0095

See application file for complete search history.

(56) References Cited

U.S. PATENT DOCUMENTS

| | | |
|---|---|---|
| 2011/0038039 A1 | 2/2011 | Takaura et al. |
| 2014/0126045 A1 | 5/2014 | Tatsuno et al. |
| 2015/0370048 A1* | 12/2015 | Takano .................. G03B 21/28 359/443 |
| 2016/0370692 A1 | 12/2016 | Ode et al. |
| 2017/0059971 A1* | 3/2017 | Takano .............. G02B 17/0852 |
| 2018/0003934 A1 | 1/2018 | Takano et al. |
| 2018/0246302 A1 | 8/2018 | Minefuji |
| 2019/0049707 A1 | 2/2019 | Okada |

OTHER PUBLICATIONS

Dec. 28, 2020 Office Action issued in U.S. Appl. No. 16/804,447.
May 3, 2021 Notice of Allowance Issued in U.S. Appl. No. 16/804,533.
May 4, 2021 Notice of Allowance Issued in U.S. Appl. No. 16/804,447.

* cited by examiner

PROJECTION SYSTEM, PROJECTION-TYPE IMAGE DISPLAY APPARATUS, AND IMAGING APPARATUS

The present application is based on, and claims priority from JP Application Serial Number 2019-037325, filed Mar. 1, 2019, the disclosure of which is hereby incorporated by reference herein in its entirety.

BACKGROUND

1. Technical Field

The present disclosure relates to a projection system including a concave reflective surface on the magnifying side of an intermediate image, a projection-type image display apparatus including the projection system, and an imaging apparatus including the projection system.

2. Related Art

JP-A-2010-20344 describes a projection-type image display apparatus that enlarges and projects a projection image formed by an image formation section via a projection system. The projection system in JP-A-2010-20344 is formed of a first optical system and a second optical system sequentially arranged from the demagnifying side toward the magnifying side. The first optical system includes a refractive optical system. The second optical system is formed of a reflection mirror having a concavely curved shape. The image formation section includes a light source and a light valve. The image formation section forms a projection image in the demagnifying-side image formation plane of the projection system. The projection system forms an intermediate image in a position between the first optical system and the reflection surface of the reflection mirror of the second optical system and projects a final image on a screen disposed on the magnifying-side image formation plane of the projection system.

In the projection system described in JP-A-2010-20344, shortening the projection distance causes the intermediate image located at the demagnifying side of the reflection mirror to inline in the direction along the optical axis of the first optical system. The intermediate image enlarges as the inclination increases. When the intermediate image enlarges, it is necessary to increase the size of the reflection mirror located at the magnifying side of the intermediate image. Therefore, in the projection system including only the reflection mirror on the magnifying side of the intermediate image, shortening the projection distance causes a problem of a tendency of an increase in the size of the reflection mirror.

SUMMARY

The present disclosure is directed to a projection system including a first optical system and a second optical system sequentially arranged from a demagnifying side toward a magnifying side, the projection system forming an intermediate image in a position between a demagnifying-side image formation plane and a magnifying-side image formation plane of the projection system. The second optical system is an optical element having a first transmissive surface, a reflective surface, and a second transmissive surface sequentially arranged from the demagnifying side toward the magnifying side. The first transmissive surface and the reflective surface are located at one side of an optical axis set in advance. The second transmissive surface is located at another side of the optical axis. The reflective surface has a concavely curved shape. The second transmissive surface has a convexly curved shape protruding toward the magnifying side. The optical element includes a first member section and a second member section made of a material different from a material of which the first member section is made with the first member section and the second member section arranged along an optical path of light rays passing through the optical element.

DESCRIPTION OF EXEMPLARY EMBODIMENTS

A projection system and a projection-type image display apparatus including the same according to embodiments of the present disclosure will be described below in detail with reference to the drawings.

Projection-Type Image Display Apparatus

Figure 1:
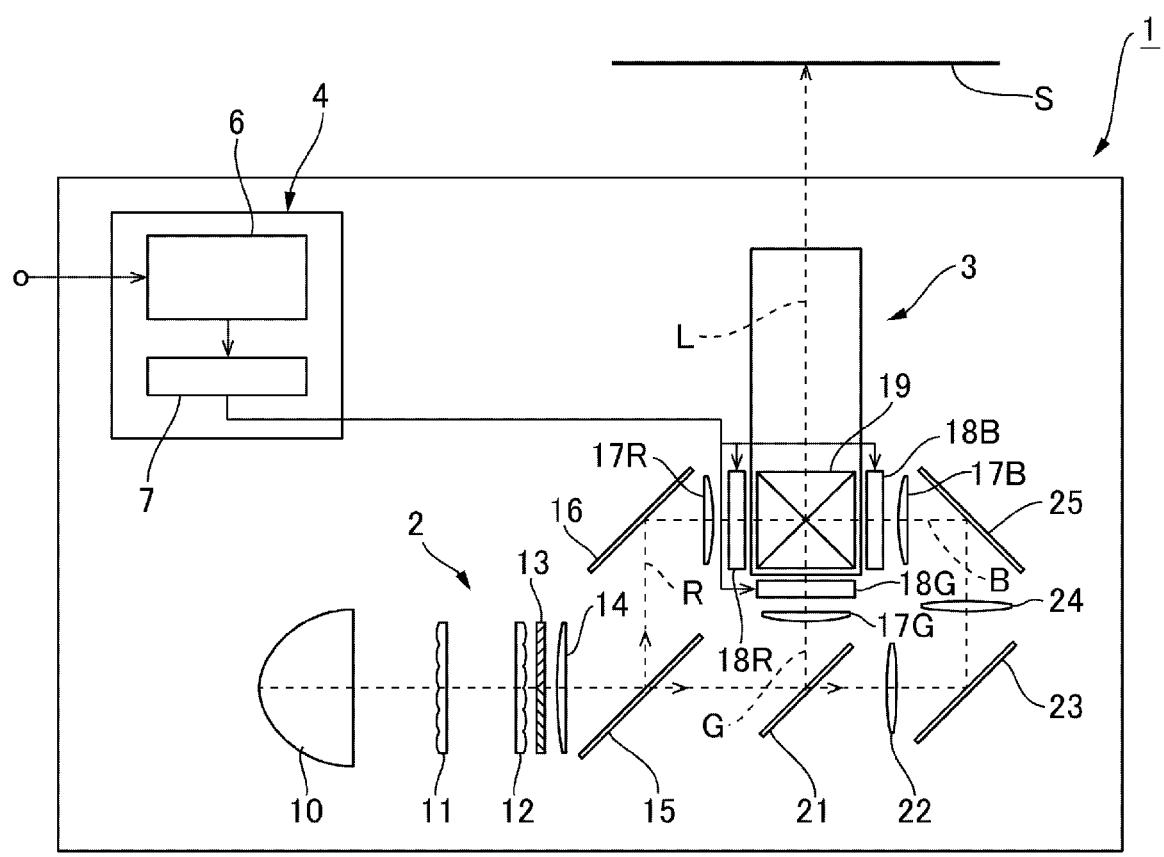
FIG. 1 is a schematic configuration diagram of a projection-type image display apparatus including a projection system.

FIG. 1 is a schematic configuration diagram of the projection-type image display apparatus including the projection system according to the present disclosure. A projection-type image display apparatus 1 includes an image formation section 2, which generates image light to be projected on a screen S, a projection system 3, which enlarges and projects the image light, and a controller 4, which controls the action of the image formation section 2, as shown in FIG. 1.

Image Light Generation System and Controller

The image formation section 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides the light flux from the light source 10 into a plurality of light fluxes. The lens elements of the first optical integration lens 11 focus the light flux from the light source 10 in the vicinity of the lens elements of the second optical integration lens 12.

The polarization converter 13 converts the light from the second optical integration lens 12 into predetermined linearly polarized light. The superimposing lens 14 superimposes images of the lens elements of the first optical integration lens 11 on one another on a display area of each of liquid crystal panels 18R, 18G, and 18B, which will be described later, via the second optical integration lens 12.

The image formation section 2 further includes a first dichroic mirror 15, a reflection mirror 16, a field lens 17R, and the liquid crystal panel 18R. The first dichroic mirror 15 reflects R light, which is part of the light rays incident via the superimposing lens 14, and transmits G light and B light, which are part of the light rays incident via the superimposing lens 14. The R light reflected off the first dichroic mirror 15 travels via the reflection mirror 16 and the field lens 17R and is incident on the liquid crystal panel 18R. The liquid crystal panel 18R is an image display device. The liquid crystal panel 18R modulates the R light in accordance with an image signal to form a red projection image.

The image formation section 2 further includes a second dichroic mirror 21, a field lens 17G, and the liquid crystal panel 18G. The second dichroic mirror 21 reflects the G light, which is part of the light rays via the first dichroic mirror 15, and transmits B light, which is part of the light rays via the first dichroic mirror 15. The G light reflected off the second dichroic mirror 21 passes through the field lens 17G and is incident on the liquid crystal panel 18G. The liquid crystal panel 18G is an image display device. The liquid crystal panel 18G modulates the G light in accordance with an image signal to form a green projection image.

The image formation section 2 further includes a relay lens 22, a reflection mirror 23, a relay lens 24, a reflection mirror 25, a field lens 17B, and the liquid crystal panel 18B. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is an image display device. The liquid crystal panel 18B modulates the B light in accordance with an image signal to form a blue projection image.

The liquid crystal panels 18R, 18G, and 18B surround a cross dichroic prism 19 in such a way that the liquid crystal panels 18R, 18G, and 18B face three sides of the cross dichroic prism 19. The cross dichroic prism 19, which is a prism for light combination, combines the light modulated by the liquid crystal panel 18R, the light modulated by the liquid crystal panel 18G, and the light modulated by the liquid crystal panel 18B with one another into image light.

The projection system 3 enlarges and projects the combined image light (projection images formed by liquid crystal panels 18R, 18G, and 18B) from the cross dichroic prism 19 on the screen S.

The controller 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors on a color basis. The display driver 7 operates the liquid crystal panels 18R, 18G, and 18B based on the color projection image signals outputted from the image processor 6. The image processor 6 thus causes the display driver 7 to display projection images corresponding to the image signals on the liquid crystal panels 18R, 18G, and 18B.

Projection System

The projection system 3 will next be described. In the following sections, Examples 1 to 3 will be described as configuration examples of the projection system 3 incorporated in the projection-type image display apparatus 1.

Example 1

Figure 2:
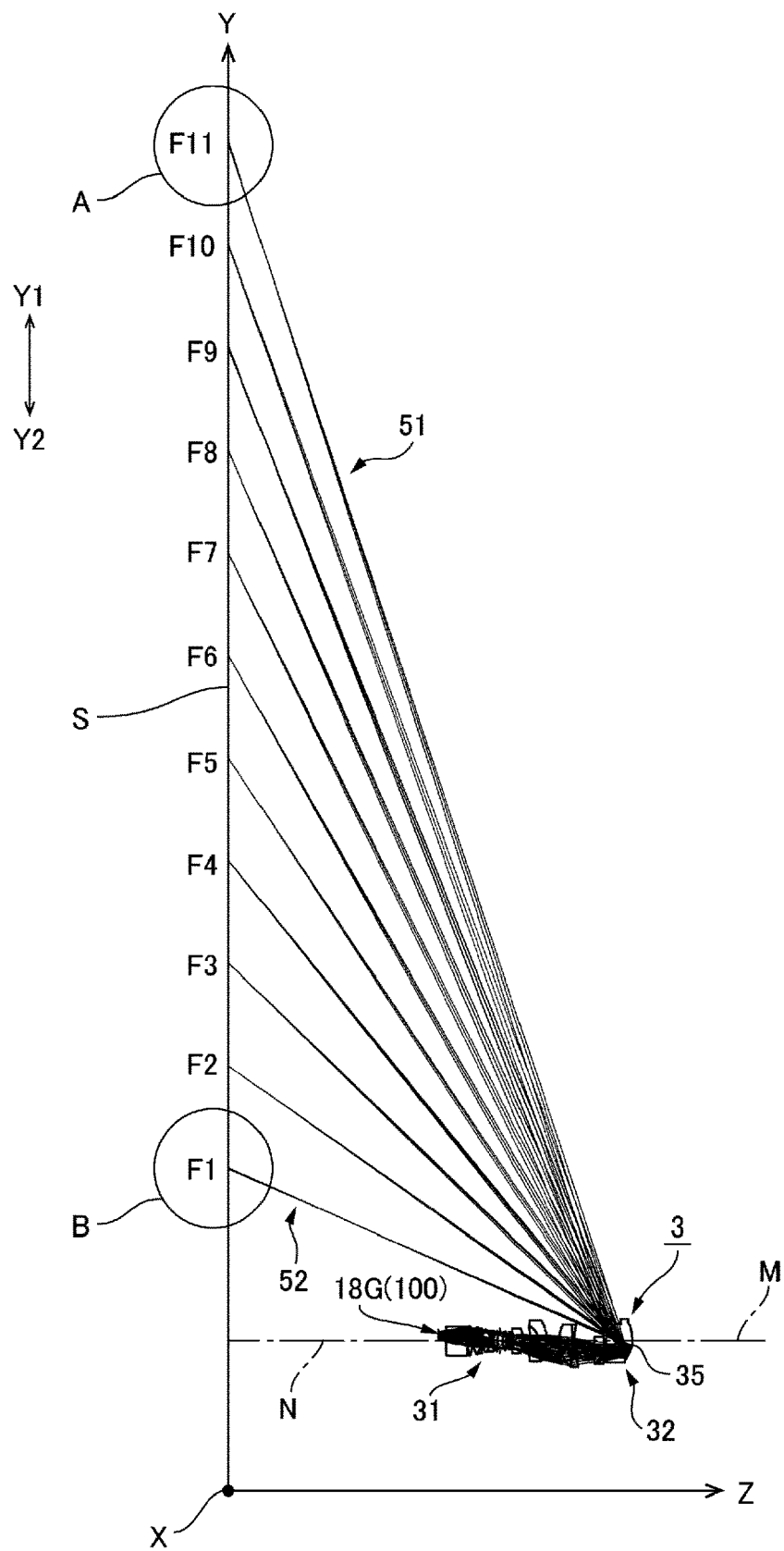
FIG. 2 is a light ray diagram diagrammatically showing the entire projection system.
Figure 3:
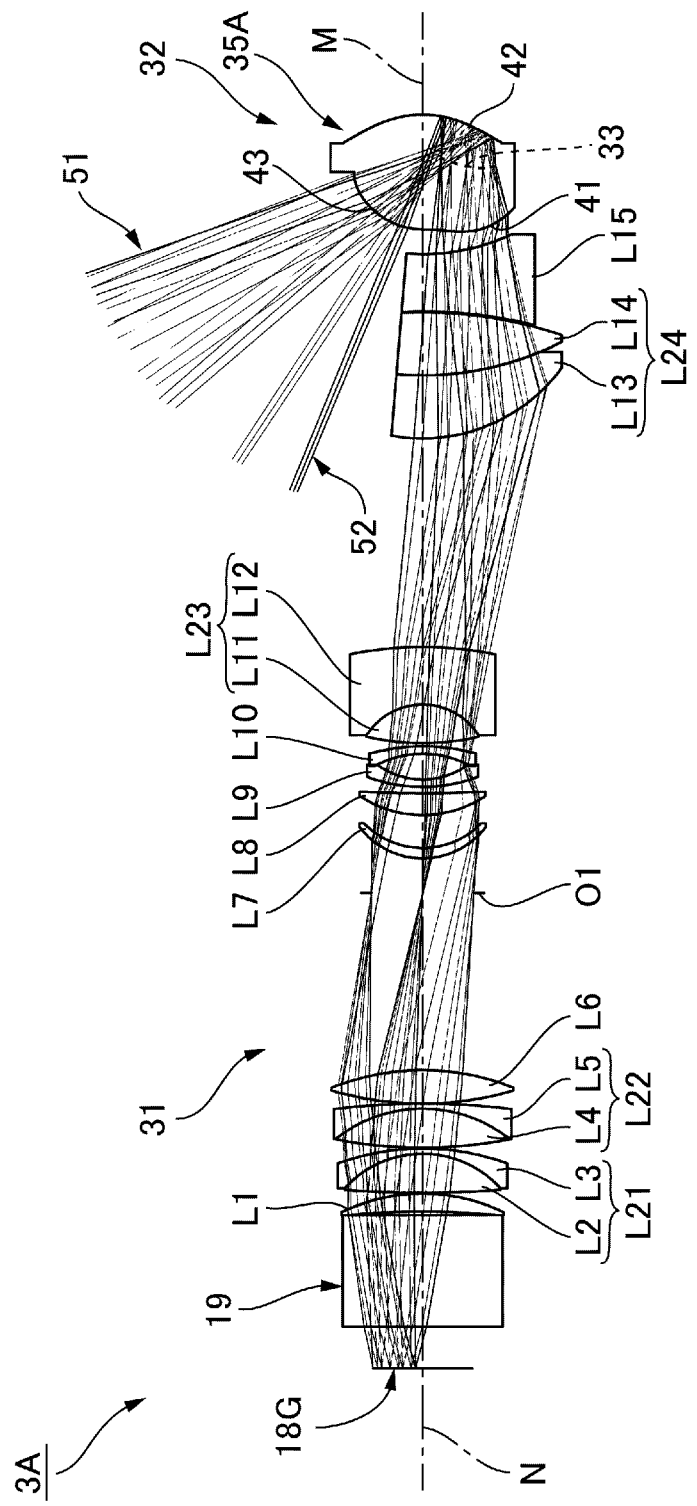
FIG. 3 is a light ray diagram of a projection system according to Example 1.
Figure 4:
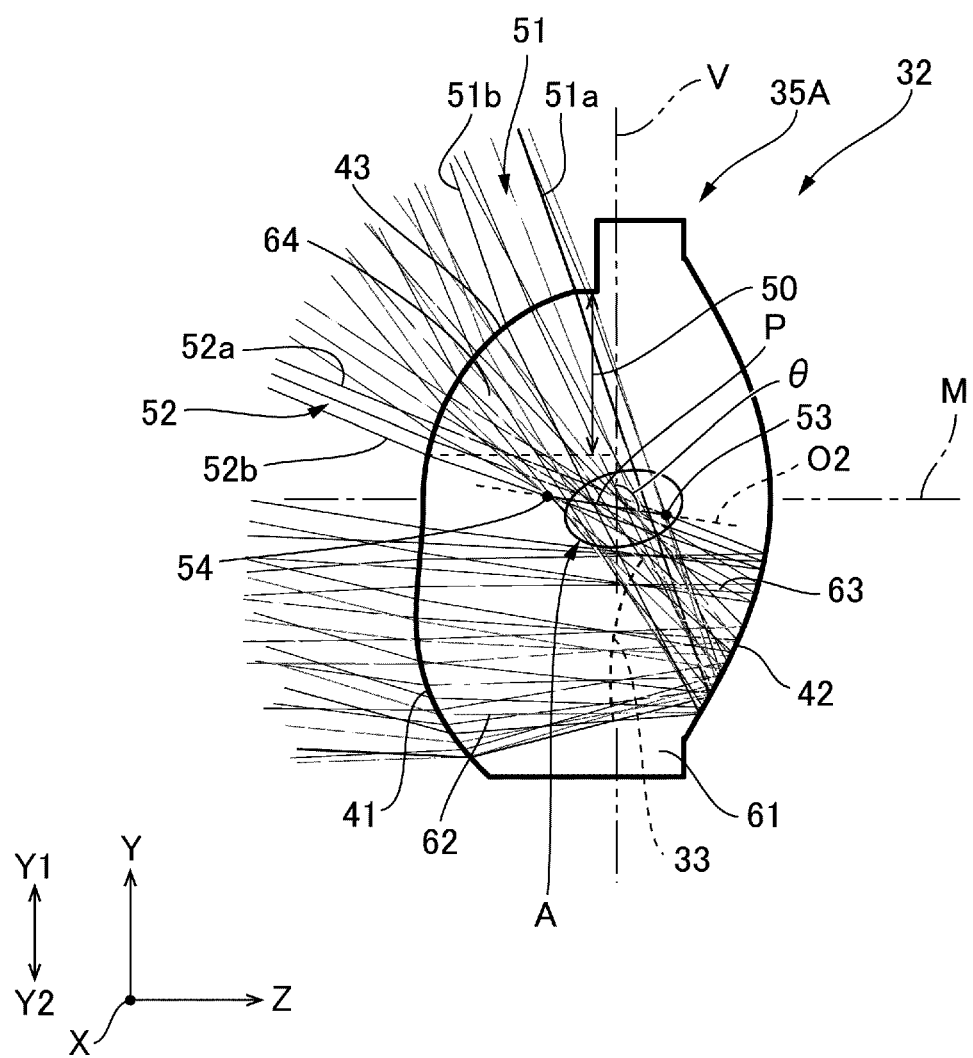
FIG. 4 is a light ray diagram of a second optical system.
Figure 5:
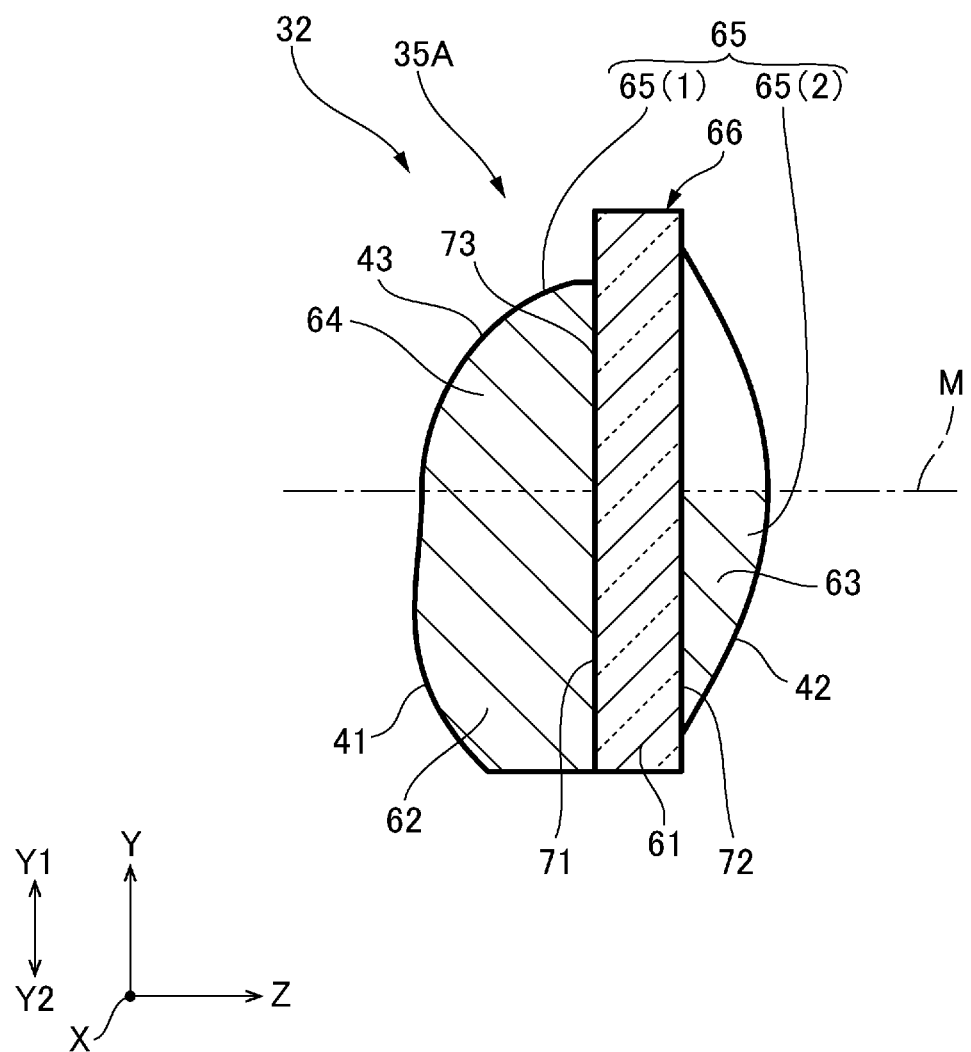
FIG. 5 describes the materials of optical elements that form the second optical system.

FIG. 2 is a light ray diagram diagrammatically showing the entire projection system 3 according to the present disclosure. FIG. 2 diagrammatically shows 11 light fluxes F1 to F11, which exit out of the projection system 3 and reach the screen S. The light flux F1 is a light flux that reaches a smallest image height position. The light flux F11 is a light flux that reaches a largest image height position. The light fluxes F2 to F10 are light fluxes that reach height positions between the height position that the light flux F1 reaches and the height position that the light flux F11 reaches. FIG. 3 is a light ray diagram of the projection system according to Example 1. FIG. 4 is a light ray diagram of a second optical system. FIG. 5 describes the materials of optical elements that form the second optical system.

A projection system 3A according to the present example is formed of a first optical system 31 and a second optical system 32 sequentially arranged from the demagnifying side toward the magnifying side, as shown in FIG. 2. The projection system 3A forms an intermediate image 33 in a position between the demagnifying-side image formation plane and the magnifying-side image formation plane of the projection system 3A, as shown in FIGS. 3 and 4. In the present example, the intermediate image 33 is formed in the second optical system 32. It is noted that the intermediate image 33 may not be formed in the second optical system 32.

The first optical system 31 is a refractive optical system including a plurality of lenses. In the present example, the first optical system 31 includes 15 lenses. The second optical system 32 is formed of 1 optical element 35A. The intermediate image 33 is formed in the optical element 35A.

The liquid crystal panels 18R, 18G, and 18B of the image formation section 2 are disposed in the demagnifying-side image formation plane. FIGS. 2 and 3 show the liquid crystal panel 18G, which is one of the three liquid crystal panels 18R, 18G, and 18B. The liquid crystal panels 18R, 18G, and 18B form projection images on a side of the demagnifying-side image formation plane that is one side of an optical axis N of the first optical system 31. The screen S is disposed in the magnifying-side image formation plane.

The first optical system 31 includes the cross dichroic prism 19 and 15 lenses L1 to L15, as shown in FIG. 3. The first lens L1 to the fifteenth lens L15 are arranged in the presented order from the demagnifying side toward the magnifying side. In the present example, the second lens L2 and the third lens L3 are bonded to each other to form a first doublet L21. The fourth lens L4 and the fifth lens L5 are bonded to each other to form a second doublet L22. The eleventh lens L11 and the twelfth lens L12 are bonded to each other to form a third doublet L23. The thirteenth lens L13 and the fourteenth lens L14 are bonded to each other to form a fourth doublet L24. A stop O is disposed between the sixth lens L6 and the seventh lens L7. The first optical system 31 in some cases includes no cross dichroic prism 19.

The optical element 35A has a first transmissive surface 41, a reflective surface 42, and a second transmissive surface 43 sequentially arranged from the demagnifying side toward the magnifying side, as shown in FIG. 4. In the following description, three axes perpendicular to one another are called axes X, Y, and Z for convenience. The direction in which the first transmissive surface 41 and the reflective surface 42 are arranged is called an axis-Z direction. One side of the axis Y is called an upper side Y1, and the other side of the axis Y is called a lower side Y2. A plane perpendicular to the axis X and containing the axes Y and Z is called a plane YZ. FIGS. 1 to 5 are therefore each viewed along the direction parallel to the axis X. The optical axis N of the first optical system 31 extends in the axis-Z direction, as shown in FIG. 2. The image formation section 2 forms projection images on the upper side Y1 of the optical axis N of the first optical system 31.

The intermediate image 33 is formed on the lower side Y2 of the optical axis N of the first optical system 31. The screen S is located at the upper side Y1 of the optical axis N of the first optical system 31. The lateral direction of the screen S coincides with the axis-X direction. The intermediate image 33 is an inverted projection image formed on the screen S but turned upside down. The intermediate image 33 is an image so distorted that an oblong final image is projected on the screen S, which is the magnifying-side image formation plane. More specifically, the intermediate image 33 has a shape that allows reduction in trapezoidal distortion of the final image formed on the screen S and having an ideal oblong shape. That is, the intermediate image 33 has distortion opposite the trapezoidal distortion of the final image. The intermediate image 33 is therefore so formed that the shortest edge thereof is the edge having the largest image height on the screen S.

In the following description, an imaginary axis M extending in the axis-Z direction is set in the plane YZ. The imaginary axis M is a reference axis used in the design of the optical element 35A. The imaginary axis M is perpendicular to the screen S, which is the magnifying-side image formation plane.

The first transmissive surface 41 and the reflective surface 42 are located at the lower side Y2 of the imaginary axis M. The second transmissive surface 43 is located at the upper side Y1 of the imaginary axis M. The reflective surface 42 has a concavely curved shape when viewed from the first transmissive surface 41 or the second transmissive surface 43. The reflective surface 42 therefore has positive power. The reflective surface 42 is provided by externally forming a reflective coating on the optical element 35A. The second transmissive surface 43 has a convexly curved shape protruding toward the magnifying side. The second transmissive surface 43 therefore has positive power. The first transmissive surface 41, the reflective surface 42, and the second transmissive surface 43 form a coaxial optical system having surfaces rotationally symmetric with respect to the imaginary axis M. The imaginary axis M is therefore the reference axis used in the design of the optical element 35A. In the present example, the imaginary axis M coincides with the optical axis N of the first optical system 31.

The upper and lower halves of the optical element 35A are configured to be rotationally symmetric with respect to the imaginary axis M. That is, the first transmissive surface 41, the reflective surface 42, and the second transmissive surface 43 are so shaped that the cross-sectional shape in the plane YZ shown in FIG. 3 is rotated around the imaginary axis M over an angular range of 90° toward one side and the other side of the axis-X direction. In the present example, the first transmissive surface 41, the reflective surface 42, and the second transmissive surface 43 are each an aspheric surface.

An imaginary line P can be specified in the optical element 35A of the second optical system 32. The imaginary line P connects an upper intersection 53 to a lower intersection 54, the upper intersection 53 being an intersection where an upper peripheral light ray 51a of an upper-end light flux 51, which is the light ray passing through the axis-Y-direction upper end of an effective light ray range 50 of the second transmissive surface 43, and an upper peripheral light ray 52a of a lower-end light flux 52, which is the light ray passing through the axis-Y-direction lower end of the effective light ray range 50, intersect with each other in the plane YZ, and the lower intersection 54 being an intersection where a lower peripheral light ray 51b of the upper-end light flux 51 and a lower peripheral light ray 52b of the lower-end light flux 52 intersect with each other in the plane YZ.

The imaginary line P inclines with respect to an imaginary vertical line V, which is perpendicular to the imaginary axis M in the plane YZ. An inclination angle θ, by which the imaginary line P inclines with respect to an imaginary vertical line V, is greater than or equal to 90°. That is, the inclination angle θ, over which a side of the imaginary line P that is the side facing the upper intersection 53 rotates counterclockwise relative to the imaginary vertical line V around the intersection of the imaginary vertical line V and the imaginary line P, is greater than 90°. It can be said that the imaginary line P is also the pupil of the projection system 3A in the plane YZ. The pupil of the projection system 3A therefore inclines with respect to the plane perpendicular to the imaginary axis M. The light rays having entered the optical element gather at the imaginary line P or in the vicinity thereof. The light rays having entered the optical element form a light flux the diameter of which is minimized in an area A in the vicinity of the imaginary line P.

In the optical element 35A, four areas, a first area 61, a second area 62, a third area 63, and a fourth area 64, can be defined along the optical path of the light rays passing through the optical element 35A, as shown in FIG. 5. The first area 61 is located between the first transmissive surface 41 and the reflective surface 42 in the axis-Z direction and between the reflective surface 42 and the second transmissive surface 43 in the axis-Z direction. The first area 61 has a fixed thickness in the axis-Z direction. In the present example, the first area 61 has a disc-like shape. The first area 61 may instead have a box-like shape. The intermediate image 33 is formed in the optical element 35A. At least part of the area A, where the diameter of the light flux formed of the light rays having entered the optical element 35A is minimized, is in the first area 61, as shown in FIG. 4.

The second area 62 is adjacent to one side of the first area 61 on the lower side Y2 of the imaginary axis M. The second area 62 has the first transmissive surface 41. An imaginary boundary plane 71 between the first area 61 and the second area 62 is a flat plane. The boundary plane 71 has a surface number 33 in lens data that will be described later.

The third area 63 is located at a side of the first area 61 that is the side opposite the second area 62 on the lower side Y2 of the imaginary axis M. The third area 63 and the first area 61 are adjacent to each other in the axis-Z direction. The third area 63 has the reflective surface 42. An imaginary boundary plane 72 between the third area 63 and the first area 61 is a flat plane. The boundary plane 72 has a surface numbers 34 and 36 in the lens data, which will be described later. The second area 62 and the third area 63 sandwich the first area 61 on the opposite sides in the axis-Z direction.

The fourth area 64 is adjacent to the one side of the first area 61 on the upper side Y1 of the imaginary axis M. The fourth area 64 is further adjacent to the upper side Y1 of the second area 62. The fourth area 64 has the second transmissive surface 43. An imaginary boundary plane 73 between the fourth area 64 and the first area 61 is a flat plane. The imaginary boundary plane 73 has a surface number 37 in the lens data, which will be described later.

In the present example, the second area 62, the third area 63, and the fourth area 64 are each made of resin. That is, the second area 62, the third area 63, and the fourth area 64 of the optical element 35A form a first member section 65 made of resin. On the other hand, the first area 61 is made of glass. That is, the first area 61 of the optical element 35A forms a second member section 66 made of glass. In the present example, the first area 61 is made of quartz glass.

The first member section 65 includes a first first member section 65(1), which is located at one side of the second member section 66 in the axis-Z direction and has the second area 62 and the fourth area 64, and a second first member section 65(2), which is located at the other side of the second member section 66 in the axis-Z direction and has the third area 63. The first first member section 65(1) is in close contact with the one side of the second member section 66 in the axis-Z direction, and the second first member section 65(2) is in close contact with the other side of the second member section 66 in the axis-Z direction. The shape of a joint surface of the first first member section 65(1) therefore conforms to the shape of a joint surface of the second member section 66 that is the surface bonded to the first first member section 65(1). The joint surface of the first first member section 65(1) and the joint surface of the second member section 66 that is the surface bonded to the first first member section 65(1) are therefore each a flat surface. The shape of a joint surface of the second member section 66 that is the surface bonded to the second first member section 65(2) conforms to the shape of a joint surface of the second first member section 65(2). The joint surface of the second member section 66 that is the surface bonded to the second first member section 65(2) and the joint surface of the second first member section 65(2) are therefore each a flat surface.

The first member section 65 and the second member section 66 differ from each other in terms of material and therefore differs from each other in terms of heat resistance. That is, the second member section 66 made of glass has higher transmittance of short-wavelength light rays than that of the first member section 65 made of resin. An increase in temperature of the second member section 66 due to absorption of short-wavelength light rays is therefore suppressed. The second member section 66 is therefore unlikely to generate heat and has high heat resistance as compared with the first member section 65.

The optical element 35A is in some cases provided with a stop O2, as indicated by the broken line in FIG. 4. The stop O2 is provided, for example, by dividing the optical element 35A along the imaginary line P, applying black ink for light blocking purposes onto the division surfaces, and then bonding the divided pieces of the optical element 35A to each other into the single optical element 35A. The stop O2 only needs to be formed by using a member capable of blocking part of the light flux that passes through the optical element 35A and is not necessarily formed by using black ink.

Lens Data

Data on the lenses of the projection system 3A are as follows: The surfaces of the lenses are numbered sequentially from the demagnifying side toward the magnifying side. A surface having a surface number with * is an aspheric surface. The surface number 1 represents the liquid crystal panel 18 and the demagnifying-side image formation plane. The surface number 2 represents the demagnifying-side surface of the cross dichroic prism 19, and the surface number 3 represents the magnifying-side surface thereof. The fields labeled with the surface number 21 show dummy data. The reference characters given to the first optical system 31 are the reference characters of the lenses thereof.

The reference characters given to the second optical system 32 represent the first transmissive surface 41, the reflective surface 42, the second transmissive surface 43, the first first member section 65(1), the second member section 66, and the second first member section 65(2). That is, the surface number 32 represents the first transmissive surface 41. The surface number 33 represents the bonding surface at which the first first member section 65(1) and the second member section 66 are bonded to each other. The surface number 34 represents the bonding surface at which the second member section 66 and the second first member section 65(2) are bonded to each other. The surface number 35 represents the reflective surface 42. The surface number 36 represents the bonding surface at which the second first member section 65(2) and the second member section 66 are bonded to each other. The surface number 37 represents the bonding surface at which the second member section 66 and the first first member section 65(1) are bonded to each other. The surface number 38 represents the second transmissive surface 43. The surface numbers 33, 34, 36, and 37 therefore each represent a surface having a planar shape. Reference character r denotes the radius of curvature in millimeters. Reference character d denotes the on-axis inter-surface distance in millimeters. Reference character nd denotes the refractive index. Reference character vd denotes the Abbe number. Reference character E denotes the effective radius.

| Surface number | Reference character | r | d | nd.vd | E |
|---|---|---|---|---|---|
| 1 | 18 | 1.000000E+18 | 7.125000E+00 | | |
| 2 | 19 | 1.000000E+18 | 1.943250E+01 | SBSL7_OHARA | 10.2460 |
| 3 | | 1.000000E+18 | 6.122123E−01 | | 12.9994 |
| 4 | L1 | −1.389956E+02 | 3.125229E+00 | 814032.2838 | 13.0000 |
| 5 | | −3.305925E+01 | 1.500000E−01 | | 13.1616 |

-continued

| Surface number | Reference character | r | d | nd.vd | E |
|---|---|---|---|---|---|
| 6 | L2 | 1.868799E+02 | 6.811206E+00 | 440669.9044 | 13.0781 |
| 7 | L3 | −1.856159E+01 | 9.000000E−01 | 846631.2381 | 13.0432 |
| 8 | | −4.418858E+01 | 1.500000E−01 | | 13.7738 |
| 9 | L4 | 8.133758E+01 | 6.797193E+00 | SBSL7_OHARA | 13.9799 |
| 10 | L5 | −2.483403E+01 | 9.000000E−01 | TAFD25_HOYA | 13.9518 |
| 11 | | −1.246978E+02 | −2.186868E−18 | | 14.4662 |
| 12 | L6 | 5.811725E+01 | 5.807587E+00 | 450186.8998 | 14.7963 |
| 13 | | −4.346780E+01 | 3.090529E+01 | | 14.7947 |
| 14 | stop | 1.000000E+18 | 6.000000E+00 | | 9.0000 |
| 15 | L7 | 1.397540E+01 | 1.819399E+00 | 439307.9210 | 10.1136 |
| 16 | | 1.454779E+01 | 5.748176E+00 | | 9.8154 |
| 17 | L8 | 2.013485E+01 | 3.798571E+00 | 846663.2378 | 10.0580 |
| 18 | | 2.088220E+02 | 1.092626E+00 | | 9.7652 |
| 19 | L9 | 2.775553E+01 | 1.300000E+00 | 605966.6170 | 8.8797 |
| 20 | | 1.373656E+01 | 2.572574E+00 | | 8.0004 |
| 21 | dummy | 1.000000E+18 | 1.897183E+00 | | 8.0000 |
| 22 | L10 | −1.783750E+01 | 1.300000E+00 | 834497.4275 | 8.0000 |
| 23 | | −3.554577E+01 | 5.570724E−01 | | 8.4858 |
| 24 | L11 | 4.396420E+01 | 6.728590E+00 | 578240.6451 | 9.0046 |
| 25 | L12 | −1.173764E+01 | 1.003692E+01 | 844962.2531 | 9.0774 |
| 26 | | −6.391509E+01 | 3.633947E+01 | | 11.7469 |
| 27 | L13 | 3.048211E+01 | 1.098635E+01 | 808760.4525 | 23.0000 |
| 28 | L14 | 5.418506E+01 | 1.098030E+01 | 554704.6736 | 20.2039 |
| 29 | | −7.764110E+01 | 1.508594E−01 | | 18.7525 |
| 30 | L15 | −8.321115E+01 | 1.000000E+01 | 846259.2415 | 18.4445 |
| 31 | | 3.708265E+01 | 4.321518E+00 | | 15.1106 |
| 32* | 41 | −2.621787E+01 | 1.000000E+00 | E48R_ZEON | 14.9862 |
| 33 | 66 | 1.000000E+18 | 5.000000E+00 | EFEL2_HOYA | 13.1505 |
| 34 | 65 (2) | 1.000000E+18 | 5.000000E+00 | E48R_ZEON | 12.8395 |
| 35* | 42 | −1.735729E+01 | −5.000000E+00 | E48R_ZEON | 12.6777 |
| 36 | 66 | 1.000000E+18 | −5.000000E+00 | EFEL2_HOYA | 10.7282 |
| 37 | 65 (1) | 1.000000E+18 | −1.000000E+01 | E48R_ZEON | 10.9751 |
| 38* | 43 | 1.233420E+01 | −2.900000E+02 | | 12.1912 |
| 39 | S | 1.000000E+18 | | | 869.3374 |

Data on the aspheric surfaces labeled with the surface numbers 32, 35, and 38 are as follows.

| Surface number | 32 | 35 | 38 |
|---|---|---|---|
| Radius of curvature in the axis-Y direction | −26.21787155 | −17.35729427 | 12.33419785 |
| Conic constant (K) | 0 | −1 | 0 |
| Fourth-order coefficient (A) | 0.000266042 | 1.8591E−05 | −2.60214E−05 |
| Sixth-order coefficient (B) | −9.37226E−07 | −8.94005E−08 | −3.02228E−07 |
| Eighth-order coefficient (C) | 2.41928E−09 | 9.68681E−10 | 3.26249E−09 |
| Tenth-order coefficient (D) | −2.73361E−12 | −5.18053E−12 | −1.17872E−11 |
| Twelfth-order coefficient (E) | 0 | 1.70617E−14 | 0 |
| Fourteenth-order coefficient (F) | 0 | −2.1489E−17 | 0 |
| Sixteenth-order coefficient (G) | 0 | 0 | 0 |
| Eighteenth-order coefficient (H) | 0 | 0 | 0 |
| Twentieth-order coefficient (J) | 0 | 0 | 0 |

Effects

In the projection system 3A according to the present example, the optical element 35A, which forms the second optical system 32, has the reflective surface 42 having a concavely curved shape and the second transmissive surface 43 having a convexly curved shape and protruding toward the magnifying side. The optical element 35A therefore allows the light flux reflected off the reflective surface 42 to be refracted by the second transmissive surface 43. The focal length, that is, the projection distance of the projection system 3A is therefore readily shortened as compared with a second optical system 32 having only the reflective surface 42. Further, since the optical element 35A has the second transmissive surface 43 having a convexly curved shape and protruding toward the magnifying side, an increase in the size of the concave reflective surface 42, which is disposed on the magnifying side of the intermediate image 33 and having a concavely curved shape, can be suppressed even in the case of a short projection distance.

Figure 6:
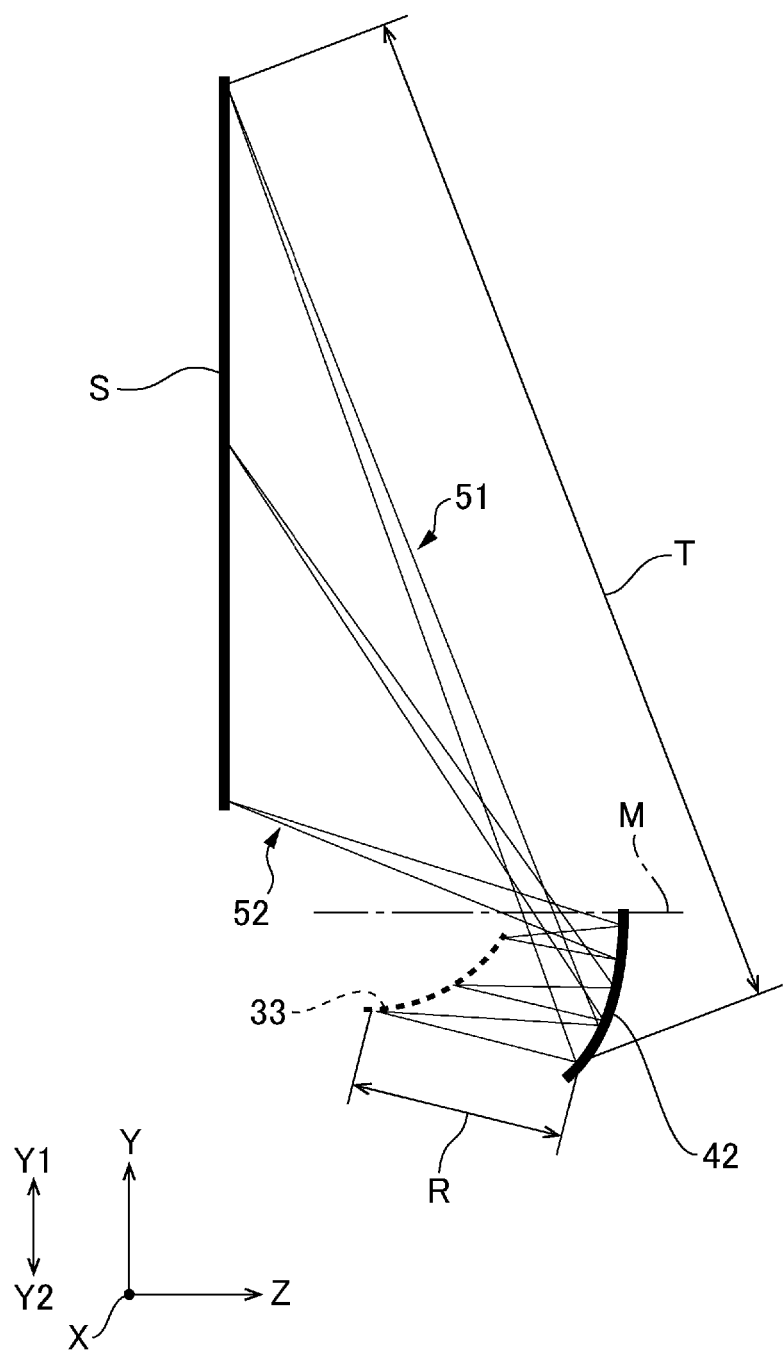
FIG. 6 describes the magnification of the projection system having only a reflective surface on the magnifying side of an intermediate image.
Figure 7:
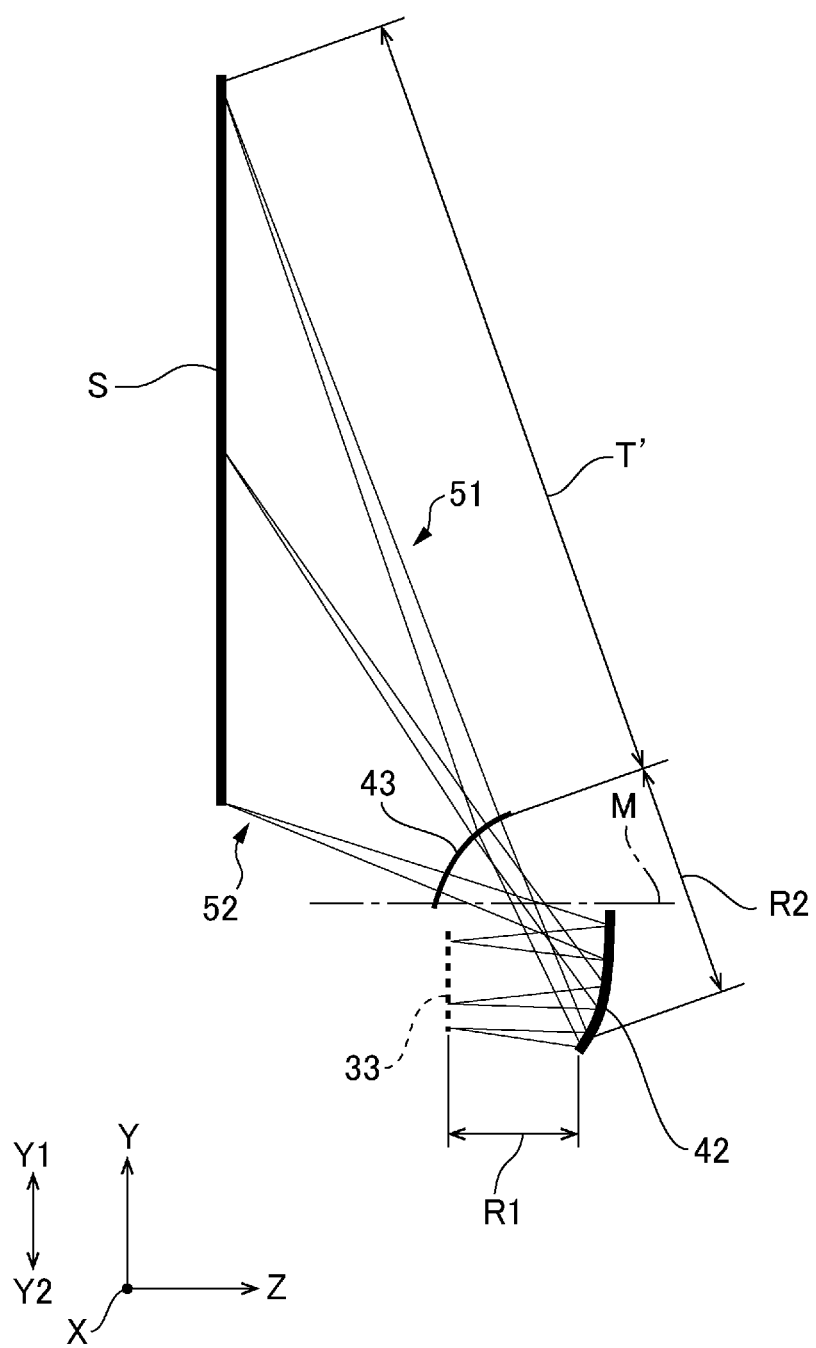
FIG. 7 describes the magnification of the projection system having a reflective surface and a second transmissive surface on the magnifying side of the intermediate image.

The effects described above will be described with reference to FIGS. 6 and 7. FIG. 6 describes the magnification of the projection system 3A including the second optical system 32 having only the reflective surface 42 on the magnifying side of the intermediate image 33. FIG. 7 describes the magnification of the projection system 3A including the second optical system 32 having the reflective surface 42 on the magnifying side of the intermediate image 33 and the convexly curved second transmissive surface 43 on the magnifying side of the reflective surface 42.

In second optical system 32 having only the reflective surface 42 on the magnifying side of the intermediate image 33, the magnification Q of the projection system 3A is the ratio of a distance T from the reflective surface 42 to the screen S to a distance R between the intermediate image 33 and the reflective surface 42 along the optical path of a specific light ray from the intermediate image 33 to the screen S, as shown in FIG. 6. That is, Q=T/R. The intermediate image 33, which is conjugate with the screen S, which is the magnifying-side image formation plane, greatly inclines toward the direction along the imaginary axis M to achieve the magnification Q and has field curvature. The size of the intermediate image 33 increases as the intermediate image 33 inclines. When the size of the intermediate image 33 increases, it is necessary to increase the size of the reflective surface 42 located at the magnifying side of the intermediate image 33. Therefore, in the projection system 3A having only the concavely curved reflective surface 42 on the magnifying side of the intermediate image 33, shorting the projection distance causes a tendency to increase in the size of the reflective surface 42. When the size of the intermediate image 33 increases, a certain distance between the first optical system 31 and the second optical system 32 is necessary, resulting in an increase in the overall length of the projection system 3A.

In contrast, in the present example, in which the second optical system 32 has the convexly curved second transmissive surface 43 on the magnifying side of the reflective surface 42, an increase in the size of the intermediate image 33 can be suppressed. That is, in the present example, the magnification Q of the projection system 3A is the ratio of a distance T' between the second transmissive surface 43 and the screen S to the sum of a distance R1 between the intermediate image 33 and the reflective surface 42 and a distance R2 between the reflective surface 42 and the second transmissive surface 43 along the optical path of a specific light ray from the intermediate image 33 to the screen S, as shown in FIG. 7. That is, $Q=T'/(R1+R2)$. The intermediate image 33, which is conjugate with the screen S, which is the magnifying-side image formation plane, therefore does not greatly incline along the imaginary axis M to achieve the same magnification on the upper and lower sides of the screen S and has reduced field curvature. As a result, an increase in the size of the intermediate image 33 can be suppressed. An increase in the size of the reflective surface 42, which is located at the magnifying side of the intermediate image 33, can therefore be suppressed. Further, if an outermost light ray 51 can be refracted inward when passing through the first transmissive surface 41, the size of the reflective surface 42 can be further reduced. Moreover, the second transmissive surface 43, which has a convexly curved shape and has positive power, causes the light flux passing through the optical element 35A to be convergent, whereby an increase in the size of the reflective surface 42 can be suppressed as compared with the case where no second transmissive surface 43 is provided.

Further, in the present example, the intermediate image 33 is located in the optical element 35A and between the first transmissive surface 41 and the reflective surface 42. The first optical system 31 can therefore be closer to the optical element 35A than in a case where the intermediate image 33 is formed in a position between the first optical system 31 and the optical element 35A. The projection system 3A can therefore be compact.

In the present example, the first transmissive surface 41, the reflective surface 42, and the second transmissive surface 43 of the second optical system 32 are each an aspheric surface. Aberrations produced by the projection system 3A according to the present example can therefore be suppressed.

Further, in the present example, since the first transmissive surface 41, which is adjacent to the intermediate image 33 on the demagnifying side, is an aspheric surface, aberrations of the intermediate image 33 can be suppressed. Moreover, in the present example, the intermediate image 33 does not greatly incline along the imaginary axis M, and the intermediate image 33 extends in the direction perpendicular to the imaginary axis M. The first transmissive surface 41 and the intermediate image 33 are therefore readily allowed to approach each other in the axis-Z direction, whereby the aspheric surface can be disposed in a position close to the intermediate image 33. Aberrations of the intermediate image 33 can therefore be efficiently corrected.

In the present example, since the imaginary line P inclines with respect to the imaginary vertical line V, the lower-end light flux 52 passing through the lower end of the effective light ray range 50 of the second transmissive surface 43 is not blocked but is allowed to reach the screen S.

Figure 8:
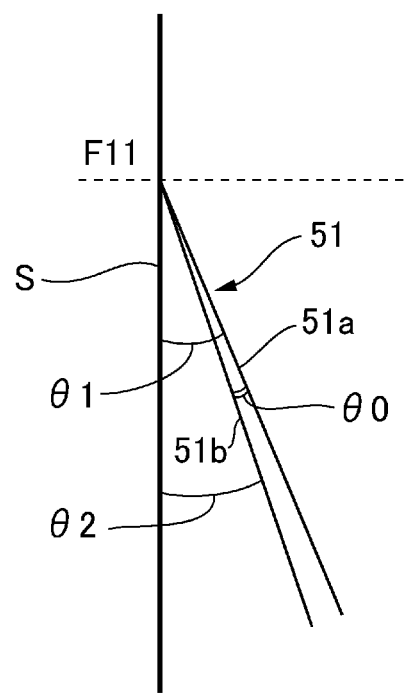
FIG. 8 describes a divergence angle of a light flux that reaches an upper portion of a screen.

Further, in the present example, since the imaginary line P inclines with respect to the imaginary vertical line V, a decrease in the amount of light at the upper periphery of the screen S can be suppressed, as compared with a case where the imaginary line P is parallel to the imaginary vertical line V. That is, when the imaginary line P inclines with respect to the imaginary vertical line V, a divergence angle θ0 of the light flux that reaches the upper portion of the screen S increases, as compared with the case where the imaginary line P is parallel to the imaginary vertical line V. The amount of light that reaches the upper portion of the screen S therefore increases. FIG. 8 describes the divergence angle of the light flux that reaches the upper portion of the screen S. FIG. 8 is a partially enlarged view of the portion A in FIG. 2. The divergence angle θ0 of the light flux that reaches the upper portion of the screen S is the difference between an angle θ1 of the upper peripheral light ray 51a of the upper-end light flux 51 with respect to the screen S and an angle θ2 of the lower peripheral light ray 51b of the upper-end light flux 51 with respect to the screen S.

Figure 9:
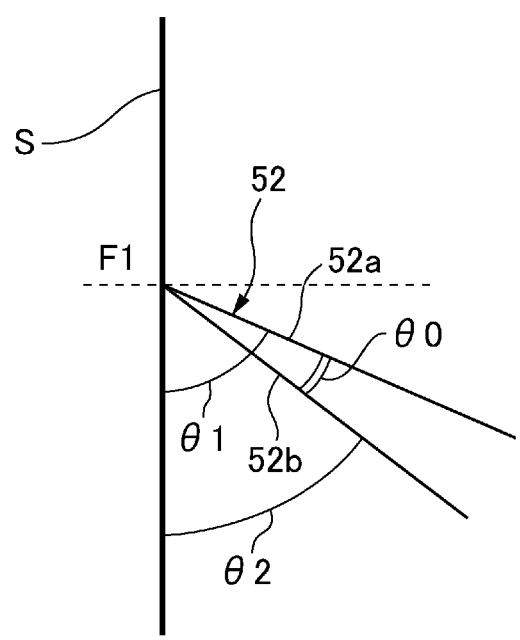
FIG. 9 describes the divergence angle of a light flux that reaches a lower portion of the screen.

When the divergence angle θ0 of the light flux that reaches the upper portion of the screen S increases, the difference between the divergence angle θ0 of the light flux that reaches the upper portion of the screen S and the divergence angle θ0 of the light flux that reaches the lower portion of the screen S decreases. A decrease in the amount of light at the upper periphery of the screen S from the amount of light at the lower periphery of the screen S can therefore be suppressed. FIG. 9 describes the divergence angle of the light flux that reaches the lower portion of the screen S. FIG. 9 is a partially enlarged view of the portion B in FIG. 2. The divergence angle θ0 of the light flux that reaches the lower portion of the screen S is the difference between an angle θ1 of the upper peripheral light ray 52a of the lower-end light flux 52 with respect to the screen S and an angle θ2 of the lower peripheral light ray 52b of the lower-end light flux 52 with respect to the screen S.

Further, in the present example, the inclination angle by which the imaginary line P inclines with respect to the imaginary vertical line V is greater than or equal to 90°. The divergence angle θ0 of the light flux that reaches the lower portion of the screen S therefore decreases. The difference in the divergence angle θ0 between the light flux that reaches the upper portion of the screen S and the light flux that reaches the lower portion of the screen S therefore decreases, whereby the difference in the amount of light between the upper portion and the lower portion of the screen S can be suppressed.

Next, in the present example, the concavely curved reflective surface 42 gathers the light rays passing through the optical element 35A in the optical element 35A. The optical density in the optical element 35A therefore increases, so that part of the optical element 35A is heated in some cases. In such cases, the heated portion of the optical element 35A undergoes thermal expansion, possibly resulting in degradation in optical performance of the projection system 3A.

To avoid the degradation, the optical element 35A includes the first member section 65 made of resin and the second member section 66 made of glass arranged along the optical path of the light rays passing through the optical element 35A. The area A, where the diameter of the light flux formed of the light rays having entered the optical element 35A is minimized, is located in the second member section 66. To this end, the area A, which is likely to be heated due to the increase in the optical density in the optical element 35A, is made of a material having high heat resistance. The situation in which the heated portion of the optical element 35A undergoes thermal expansion and therefore causes degradation in optical performance of the projection system 3A can therefore be suppressed or avoided.

The second member section 66 made of glass has flat opposite surfaces. The second member section 66 can therefore be readily manufactured. On the other hand, in the optical element 35A, the second area 62 having the aspheric first transmissive surface 41, the third area 63 having the aspheric reflective surface 42, and the fourth area 64 having the aspheric second transmissive surface 43 are each part of the first member section 65 and made of resin. The optical element 35A is therefore readily provided with aspheric surfaces, as compared with an optical element 35A including the second area 62, the third area 63, and the fourth area 64 each made of glass.

Further, since the intermediate image 33 is formed in the second member section 66, the intermediate image 33 does not cross the bonding surface at which the first member section 65 and the second member section 66 are bonded to each other. The configuration described above can avoid degradation of a projection image resulting from the intermediate image 33 located at the bonding surface at which the first member section 65 and the second member section 66 are bonded to each other.

Further, in the present example, the first first member section 65(1), which is located at one side of the second member section 66 in the axis-Z direction, can be provided with both the first transmissive surface 41 and the second transmissive surface 43. The optical element 35A can therefore be readily manufactured.

Figure 10:
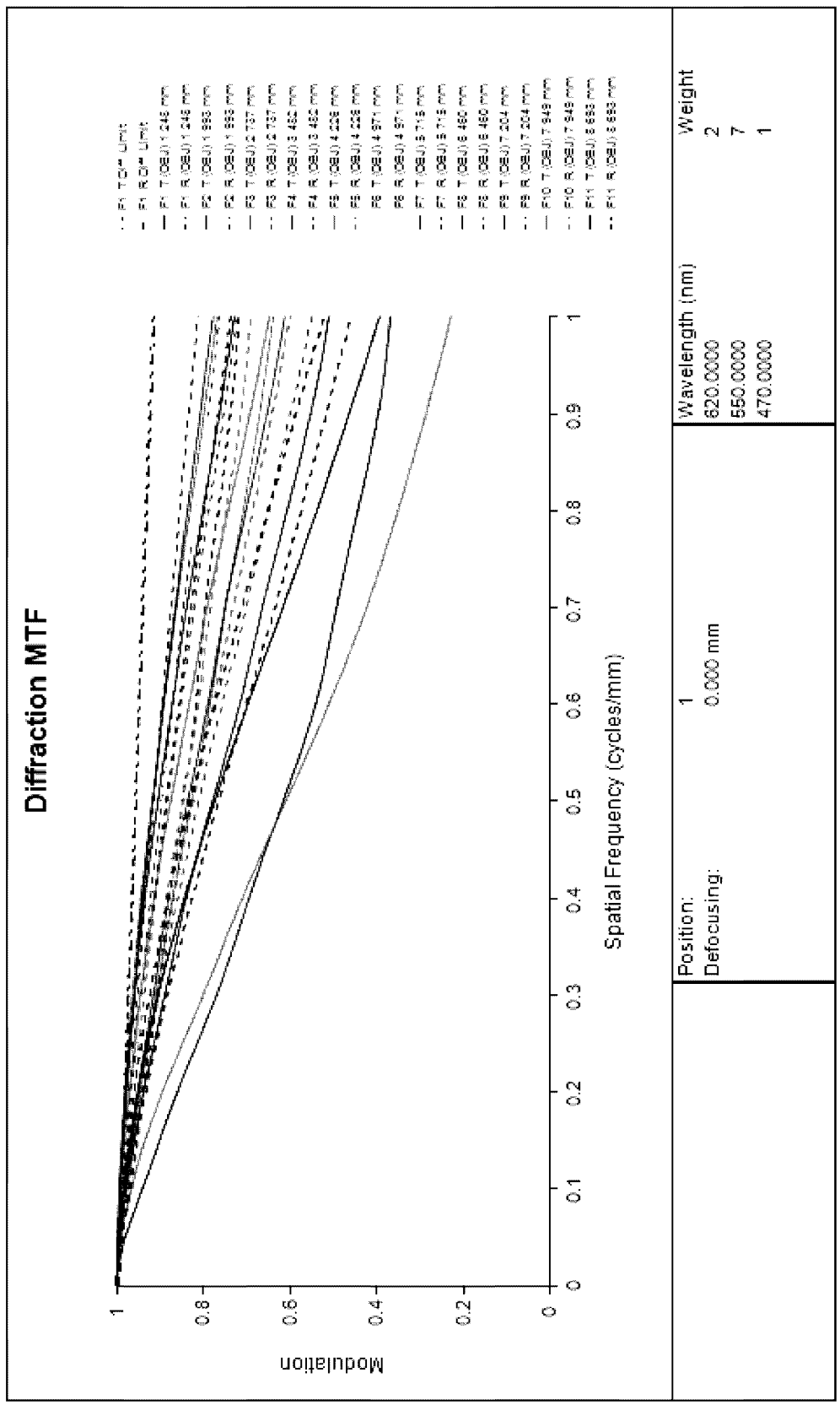
FIG. 10 shows the magnifying-side MTF of the projection system according to Example 1.

FIG. 10 shows the magnifying-side MTF of the projection system 3A. The horizontal axis of FIG. 10, which shows the MTF, represents the spatial frequency. The vertical axis of FIG. 10 represents a contrast reproduction ratio. In the present example, a decrease in resolution is suppressed, as shown in FIG. 10.

Example 2

Figure 11:
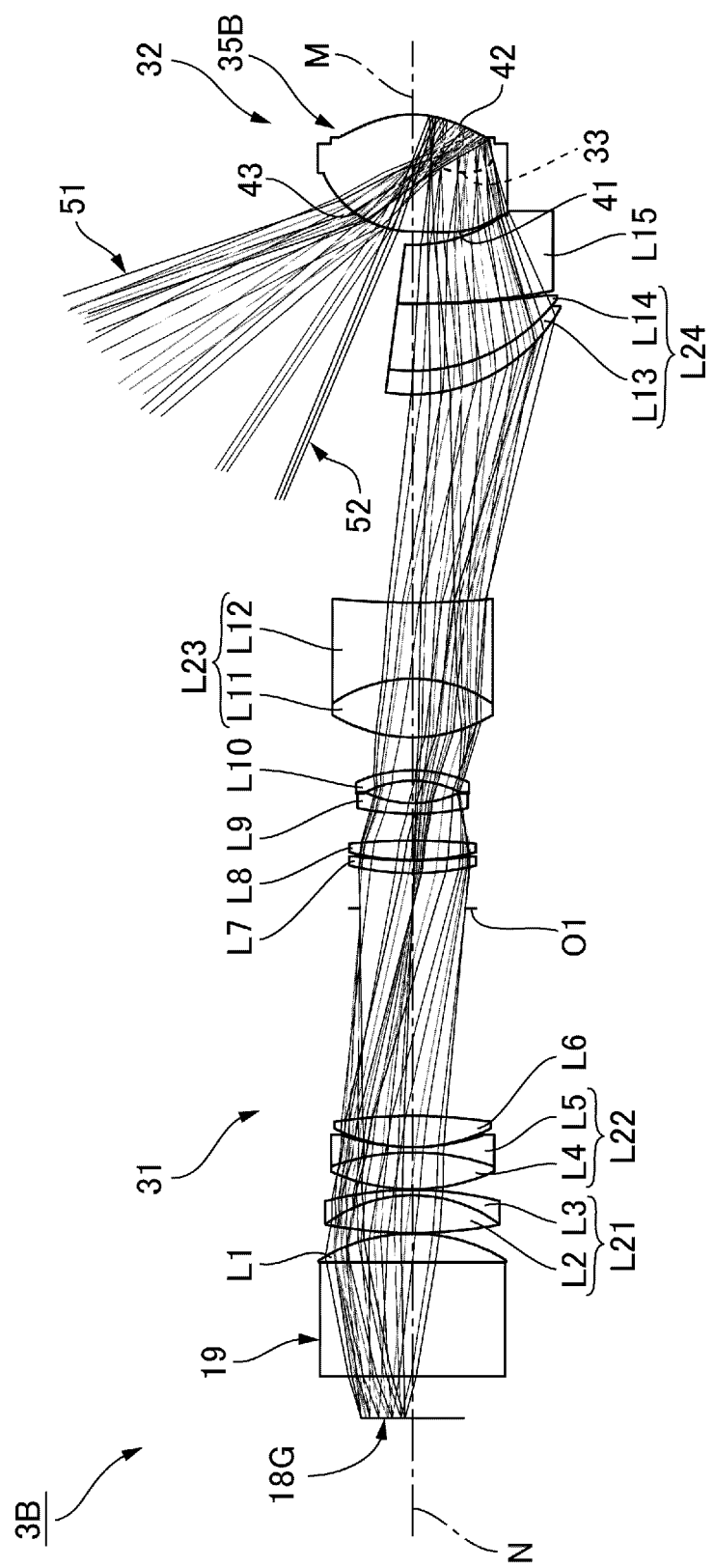
FIG. 11 is a light ray diagram of a projection system according to Example 2.
Figure 12:
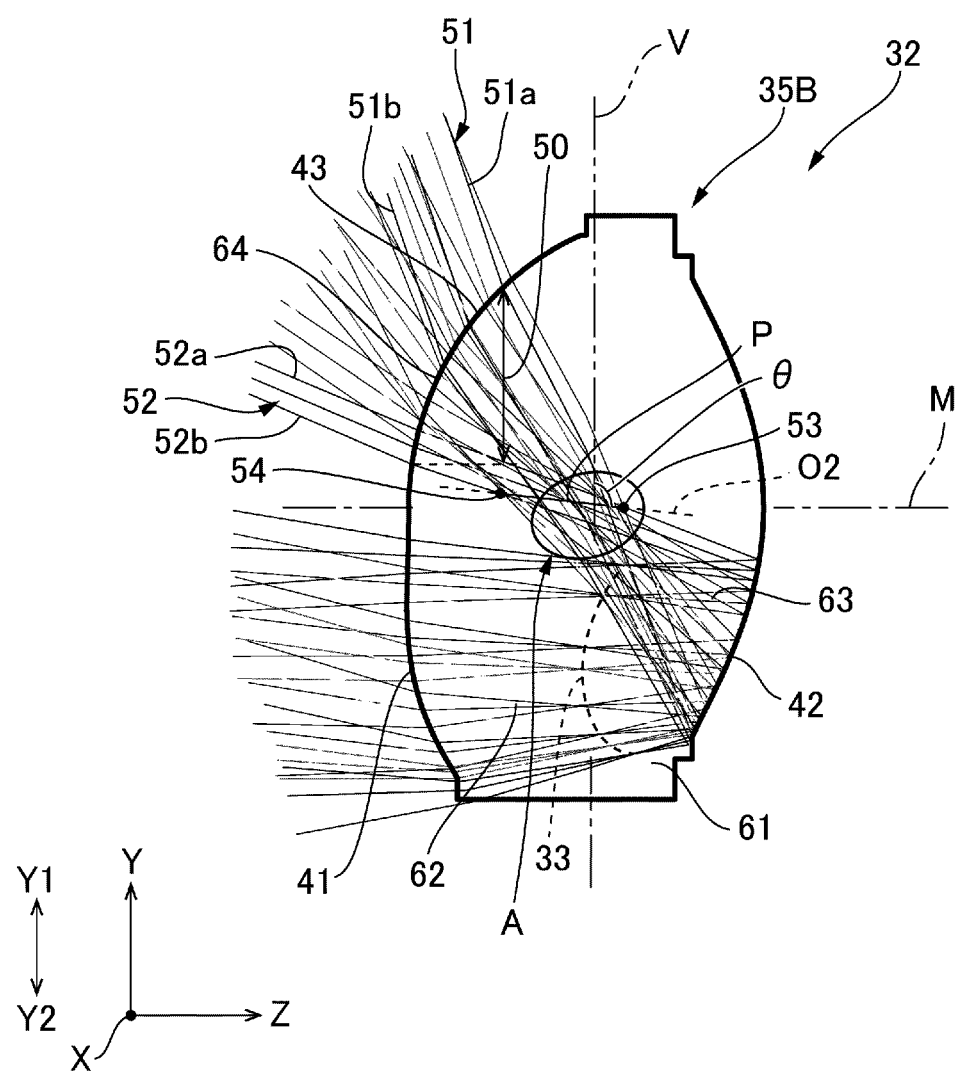
FIG. 12 is a light ray diagram of a second optical system in Example 2.
Figure 13:
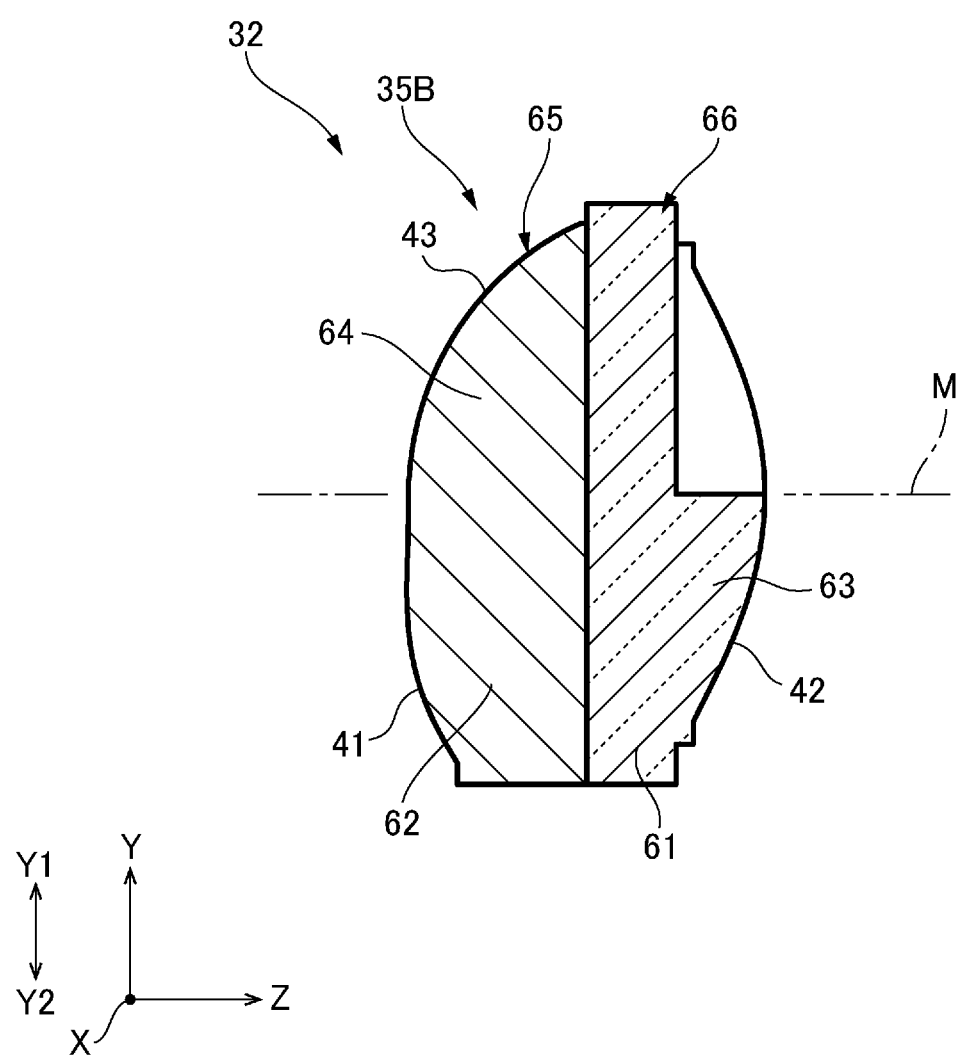
FIG. 13 describes the materials of optical elements that form the second optical system in Example 2.

FIG. 11 is a light ray diagram of a projection system according to Example 2. FIG. 12 is a light ray diagram of a second optical system of a projection system according to Example 2. FIG. 13 describes the materials of optical elements that form the second optical system. A projection system 3B according to the present example is formed of the first optical system 31 and the second optical system 32 sequentially arranged from the demagnifying side toward the magnifying side, as shown in FIG. 2. The projection system 3B forms the intermediate image 33 in a position between the demagnifying-side image formation plane and the magnifying-side image formation plane of the projection system 3B, as shown in FIGS. 11 and 12. In the present example, the intermediate image 33 is formed in the second optical system 32. It is noted that the intermediate image 33 may not be formed in the second optical system 32. The first optical system 31 in some cases includes no cross dichroic prism 19. The projection system 3B has a configuration corresponding to the projection system 3A according to Example 1, and the corresponding components therefore have the same reference characters and will not be described.

The first optical system 31 is a refractive optical system including a plurality of lenses. In the present example, the first optical system 31 includes 15 lenses. The second optical system 32 is formed of 1 optical element 35B. The intermediate image 33 is formed in the optical element 35B.

Also in the optical element 35B, the four areas, the first area 61, the second area 62, the third area 63, and the fourth area 64, can be defined along the optical path of the light rays passing through the optical element 35B, as shown in FIG. 13. The first area 61 is located between the first transmissive surface 41 and the reflective surface 42 in the axis-Z direction and between the reflective surface 42 and the second transmissive surface 43 in the axis-Z direction. The first area 61 has a fixed thickness in the axis-Z direction. In the present example, the first area 61 has a disc-like shape. The intermediate image 33 is formed in the optical element 35B. At least part of the area A, where the diameter of the light flux formed of the light rays having entered the optical element 35B is minimized, is in the first area 61, as shown in FIG. 12. The second area 62 is adjacent to one side of the first area 61 on the lower side Y2 of the imaginary axis M. The second area 62 has the first transmissive surface 41. The third area 63 is located at a side of the first area 61 that is the side opposite the second area 62 on the lower side Y2 of the imaginary axis M. The third area 63 and the first area 61 are adjacent to each other in the axis-Z direction. The third area 63 has the reflective surface 42. The second area 62 and the third area 63 sandwich the first area 61 on the opposite sides in the axis-Z direction. The fourth area 64 is adjacent to the one side of the first area 61 on the upper side Y1 of the imaginary axis M. The fourth area 64 is further adjacent to the upper side Y1 of the second area 62. The fourth area 64 has the second transmissive surface 43.

In the present example, the second area 62 and the fourth area 64 are each made of resin. That is, the second area 62 and the fourth area 64 of the optical element 35B form the first member section 65 made of resin, as shown in FIG. 13. On the other hand, the first area 61 and the third area 63 are each made of quartz glass. That is, the first area 61 and the third area 63 of the optical element 35B form the second member section 66 made of glass. The first member section 65 includes the second area 62 and the fourth area 64 integrated with each other. The second member section 66 includes the first area 61 and the third area 63 integrated with each other.

The first member section 65 is in close contact with the one side of the second member section 66 in the axis-Z direction. The shape of a joint surface of the first member section 65 therefore conforms to the shape of a joint surface of the second member section 66 that is the surface bonded to the first member section 65. The joint surface of the first member section 65 and the joint surface of the second member section 66 that is the surface bonded to the first member section 65 are therefore each a flat surface.

The second member section 66 is made of glass and is therefore unlikely to generate heat and has high heat resistance as compared with the first member section 65 made of resin. The optical element 35B is in some cases provided with the stop O2, as indicated by the broken line in FIG. 12. The stop O2 is provided, for example, by dividing the optical element 35B along the imaginary line P, applying black ink for light blocking purposes onto the division surfaces, and then bonding the divided pieces of the optical element 35B to each other into the single optical element 35B. The stop O2 only needs to be formed by using a member capable of blocking part of the light flux that passes through the optical element 35B and is not necessarily formed by using black ink.

Lens Data

Data on the lenses of the projection system 3B are as follows: The surfaces of the lenses are numbered sequentially from the demagnifying side toward the magnifying side. A surface having a surface number with * is an aspheric surface. The surface number 1 represents the liquid crystal panel 18 and the demagnifying-side image formation plane. The surface number 2 represents the demagnifying-side surface of the cross dichroic prism 19, and the surface number 3 represents the magnifying-side surface thereof. The fields labeled with the surface number 21 show dummy data. The reference characters given to the first optical system 31 are the reference characters of the lenses thereof.

The reference characters given to the second optical system 32 represent the first transmissive surface 41, the reflective surface 42, the second transmissive surface 43, the first member section 65, and the second member section 66. That is, the surface number 32 represents the first transmissive surface 41. The surface number 33 represents the bonding surface at which the first member section 65 and the second member section 66 are bonded to each other. The surface number 34 represents an imaginary boundary plane between the first area 61 and the third area 63. The surface number 35 represents the reflective surface 42. The surface number 36 represents an imaginary boundary plane between the third area 63 and the first area 61. The surface number 37 represents the bonding surface at which the second member section 66 and the first member section 65 are bonded to each other. The surface number 38 represents the second transmissive surface 43. The surface numbers 33, 34, 36, and 37 each represent a surface having a planar shape. Reference character r denotes the radius of curvature in millimeters. Reference character d denotes the on-axis inter-surface distance in millimeters. Reference character nd denotes the refractive index. Reference character vd denotes the Abbe number. Reference character E denotes the effective radius.

| Surface number | Reference character | r | d | nd.vd | E |
|---|---|---|---|---|---|
| 1 | 18 | 1.000000E+18 | 7.125000E+00 | | |
| 2 | 19 | 1.000000E+18 | 1.943250E+01 | SBSL7_OHARA | 10.8540 |
| 3 | | 1.000000E+18 | 1.000000E-01 | | 14.6393 |
| 4 | L1 | -2.182215E+03 | 4.822720E+00 | 834805.4272 | 13.0000 |
| 5 | | -3.028955E+01 | 1.500000E-01 | | 14.8178 |
| 6 | L2 | 7.956298E+01 | 6.390268E+00 | 491175.7833 | 13.9167 |
| 7 | L3 | -2.476253E+01 | 9.000000E-01 | 842686.2770 | 13.7430 |
| 8 | | -5.951605E+01 | 1.500000E-01 | | 13.7379 |
| 9 | L4 | 3.368854E+01 | 6.264058E+00 | SBSL7_OHARA | 12.8196 |
| 10 | L5 | -4.120156E+01 | 9.000000E-01 | TAFD25_HOYA | 12.4756 |
| 11 | | 3.611656E+01 | -3.870300E-18 | | 12.1151 |
| 12 | L6 | 2.922427E+01 | 5.324238E+00 | 446256.8644 | 12.2285 |
| 13 | | -8.867741E+01 | 3.544122E+01 | | 12.1973 |
| 14 | stop | 1.000000E+18 | 6.000000E+00 | | 9.0000 |
| 15 | L7 | 4.599757E+01 | 2.147463E+00 | 716279.2784 | 9.8163 |
| 16 | | 6.737324E+01 | 1.000000E-01 | | 9.7701 |
| 17 | L8 | 4.480886E+01 | 3.283564E+00 | 846663.2378 | 9.7994 |
| 18 | | -1.174937E+02 | 4.598734E+00 | | 9.6739 |
| 19 | L9 | 4.637311E+01 | 1.800000E+00 | 632729.5055 | 8.5200 |
| 20 | | 1.804972E+01 | 1.872167E+00 | | 8.0000 |
| 21 | dummy | 1.000000E+18 | 1.944532E+00 | | 8.0000 |
| 22 | L10 | -1.745039E+01 | 1.800000E+00 | 814729.4395 | 8.0005 |
| 23 | | -2.335179E+01 | 5.637605E+00 | | 8.7067 |
| 24 | L11 | 2.635738E+01 | 1.000000E+01 | 596577.6260 | 11.6879 |
| 25 | L12 | -2.387527E+01 | 1.296403E+01 | 846663.2378 | 11.6023 |
| 26 | | 1.402851E+02 | 3.554280E+01 | | 12.5704 |
| 27 | L13 | 2.887653E+01 | 4.028096E+00 | 551520.6778 | 23.0000 |
| 28 | L14 | 3.084711E+01 | 1.139258E+01 | 754649.5234 | 23.6478 |
| 29 | | 1.812929E+02 | 1.000000E-01 | | 22.8619 |
| 30 | L15 | 1.349890E+02 | 1.000000E+01 | 846663.2378 | 22.4608 |
| 31 | | 2.598188E+01 | 2.261108E+00 | | 16.3109 |
| 32* | 41 | -6.290446E+01 | 1.000000E+01 | E48R_ZEON | 14.9862 |
| 33 | 66 | 1.000000E+18 | 5.000000E+00 | 450720.6720 | 14.4627 |
| 34 | | 1.000000E+18 | 5.000000E+00 | 450720.6720 | 12.8395 |
| 35* | 42 | -1.727674E+01 | -5.000000E+00 | 450720.6720 | 12.6777 |
| 36 | | 1.000000E+18 | -5.000000E+00 | 450720.6720 | 11.8454 |
| 37 | 65 | 1.000000E+18 | -1.000000E+01 | E48R_ZEON | 5.0555 |
| 38* | 43 | 1.603858E+01 | -2.900000E+02 | | 12.6156 |
| 39 | S | 1.000000E+18 | | | 870.1604 |

Data on the aspheric surfaces labeled with the surface numbers 32, 35, and 38 are as follows.

| Surface number | 32 | 35 | 38 |
|---|---|---|---|
| Radius of curvature in the axis-Y direction | -62.90445989 | -17.2767367 | 16.0385788 |
| Conic constant (K) | 0 | -1 | 0 |
| Fourth-order coefficient (A) | 0.000162374 | 2.48539E-05 | -2.76633E-05 |
| Sixth-order coefficient (B) | -5.39335E-07 | -1.08737E-07 | 1.85418E-07 |
| Eighth-order coefficient (C) | 1.57435E-09 | 1.15451E-09 | -6.04999E-10 |

-continued

| Surface number | 32 | 35 | 38 |
| --- | --- | --- | --- |
| Tenth-order coefficient (D) | −2.68081E−12 | −3.59291E−12 | 2.12972E−14 |
| Twelfth-order coefficient (E) | 0 | −3.4373E−15 | 0 |
| Fourteenth-order coefficient (F) | 0 | 4.11518E−17 | 0 |
| Sixteenth-order coefficient (G) | 0 | 0 | 0 |
| Eighteenth-order coefficient (H) | 0 | 0 | 0 |
| Twentieth-order coefficient (J) | 0 | 0 | 0 |

Effects

In the projection system 3B according to the present example, the optical element 35B, which forms the second optical system 32, has the reflective surface 42 having a concavely curved shape and the second transmissive surface 43 having a convexly curved shape and protruding toward the magnifying side. The optical element 35B therefore allows the light flux reflected off the reflective surface 42 to be refracted by the second transmissive surface 43. The focal length, that is, the projection distance of the projection system 3B is therefore readily shortened as compared with a second optical system 32 having only the reflective surface 42. Further, since the optical element 35B has the second transmissive surface 43 having a convexly curved shape and protruding toward the magnifying side, an increase in the size of the concave reflective surface 42, which is disposed on the magnifying side of the intermediate image 33 and having a concavely curved shape, can be suppressed even in the case of a short projection distance.

Further, in the present example, the intermediate image 33 is located in the optical element 35B and between the first transmissive surface 41 and the reflective surface 42. The first optical system 31 can therefore be closer to the optical element 35B than in a case where the intermediate image 33 is formed in a position between the first optical system 31 and the optical element 35B. The projection system 3B can therefore be compact.

In the present example, the first transmissive surface 41, the reflective surface 42, and the second transmissive surface 43 of the second optical system 32 are each an aspheric surface. Aberrations produced by the projection system 3B according to the present example can therefore be suppressed.

Further, in the present example, since the first transmissive surface 41, which is adjacent to the intermediate image 33 on the demagnifying side, is an aspheric surface, aberrations of the intermediate image 33 can be suppressed. Moreover, in the present example, the intermediate image 33 does not greatly incline along the imaginary axis M, and the intermediate image 33 extends in the direction perpendicular to the imaginary axis M. The first transmissive surface 41 and the intermediate image 33 are therefore readily allowed to approach each other in the axis-Z direction, whereby the aspheric surface can be disposed in a position close to the intermediate image 33. Aberrations of the intermediate image 33 can therefore be efficiently corrected.

In the present example, since the imaginary line P inclines with respect to the imaginary vertical line V, the lower-end light flux 52 passing through the lower end of the effective light ray range 50 of the second transmissive surface 43 is not blocked but is allowed to reach the screen S.

Further, in the present example, since the imaginary line P inclines with respect to the imaginary vertical line V, a decrease in the amount of light at the upper periphery of the screen S can be suppressed, as compared with a case where the imaginary line P is parallel to the imaginary vertical line V. Moreover, when the divergence angle θ0 of the light flux that reaches the upper portion of the screen S increases, the difference between the divergence angle θ0 of the light flux that reaches the upper portion of the screen S and the divergence angle θ0 of the light flux that reaches the lower portion of the screen S decreases. A decrease in the amount of light at the upper periphery of the screen S from the amount of light at the lower periphery of the screen S can therefore be suppressed.

Further, in the present example, the inclination angle by which the imaginary line P inclines with respect to the imaginary vertical line V is greater than or equal to 90°. The divergence angle θ0 of the light flux that reaches the lower portion of the screen S therefore decreases. The difference in the divergence angle θ0 between the light flux that reaches the upper portion of the screen S and the light flux that reaches the lower portion of the screen S therefore decreases, whereby the difference in the amount of light between the upper portion and the lower portion of the screen S can be suppressed.

In the present example, the optical element 35B includes the first member section 65 made of resin and the second member section 66 made of glass arranged along the optical path of the light rays passing through the optical element 35B. The area A, where the diameter of the light flux formed of the light rays having entered the optical element 35B is minimized, is located in the second member section 66. To this end, the area A, which is likely to be heated due to the increase in the optical density in the optical element 35B, is made of a material having high heat resistance. The situation in which the heated portion of the optical element 35B undergoes thermal expansion and therefore causes degradation in optical performance of the projection system 3B can therefore be suppressed or avoided.

In the present example, the third area 63 having the reflective surface 42 is the second member section 66 made of glass. In the third area 63, since the light rays traveling from the demagnifying side toward the reflective surface 42 and the light rays reflected off the reflective surface 42 and traveling toward the magnifying side overlap with each other, the optical density increases and the temperature is likely to increase accordingly. To avoid the problem described above, in the present example, the third area 63 is the second member section 66 made of glass, whereby the situation in which the heated portion of the third area 63 undergoes thermal expansion and therefore causes degradation in optical performance of the projection system 3B can be suppressed or avoided.

Further, since the intermediate image 33 is formed in the second member section 66, the intermediate image 33 does not cross the bonding surface at which the first member section 65 and the second member section 66 are bonded to each other. The configuration described above can avoid degradation of a projection image resulting from the bonding surface at which the first member section 65 and the second member section 66 are bonded to each other.

Further, in the present example, the first member section 65, which is located at one side of the second member section 66 in the axis-Z direction, is provided with both the first transmissive surface 41 and the second transmissive surface 43. The optical element 35B in the present example is formed of one first member section 65 and one second member section 66. The optical element 35B is therefore readily manufactured as compared with an optical element 35B including the first member section 65 provided at two separate locations therein.

Further, the second area 62 having the aspheric first transmissive surface 41 and the fourth area 64 having the aspheric second transmissive surface 43 are each made of resin. The optical element 35B is therefore readily provided with the aspheric first transmissive surface 41 and the aspheric second transmissive surface 43, as compared with an optical element 35B including the second area 62 and the fourth area 64 each made of glass.

Figure 14:
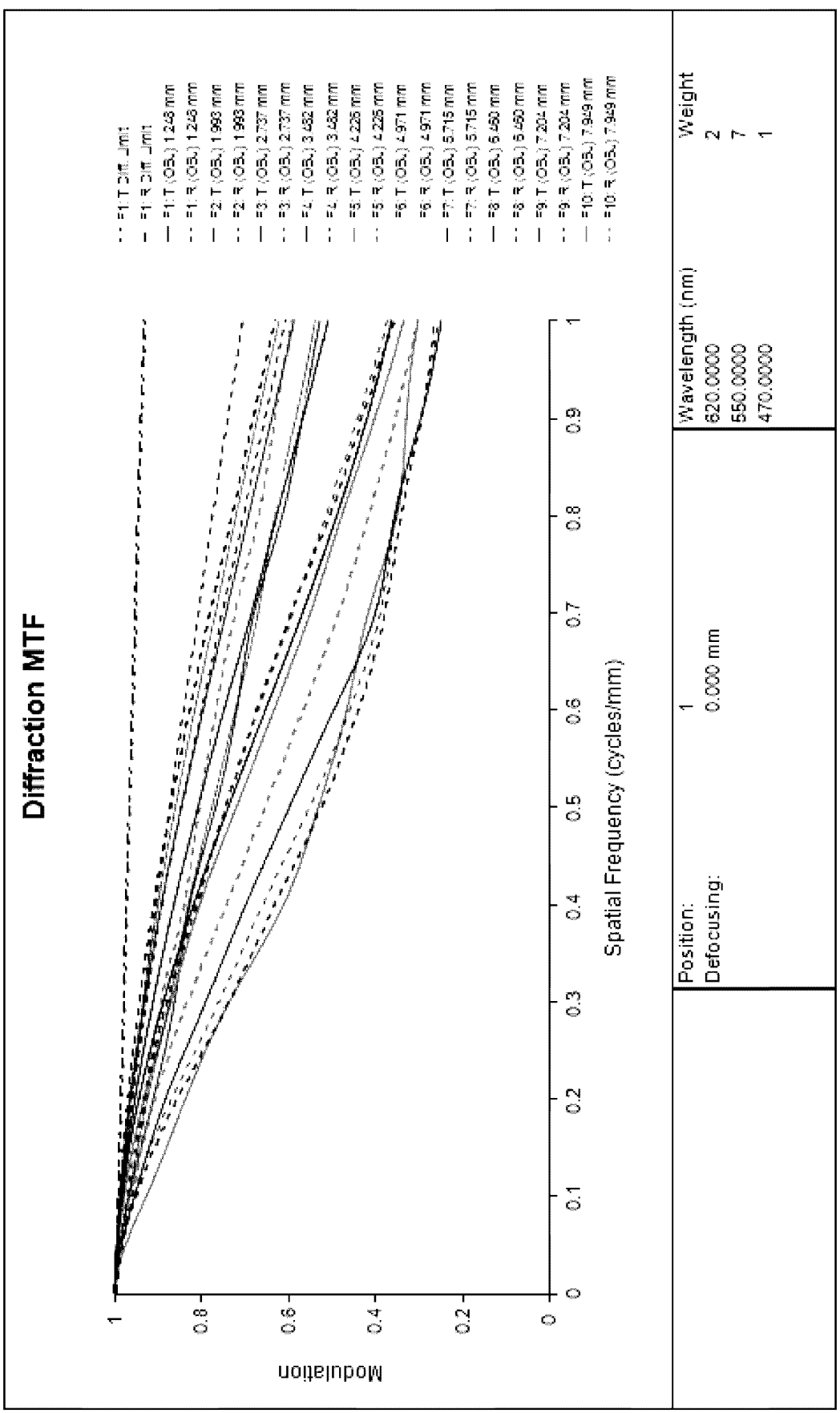
FIG. 14 shows the magnifying-side MTF of the projection system according to Example 2.

FIG. 14 shows the magnifying-side MTF of the projection system 3B. The horizontal axis of FIG. 14, which shows the MTF, represents the spatial frequency. The vertical axis of FIG. 14 represents a contrast reproduction ratio. In the present example, a decrease in resolution is suppressed, as shown in FIG. 14.

Example 3

Figure 15:
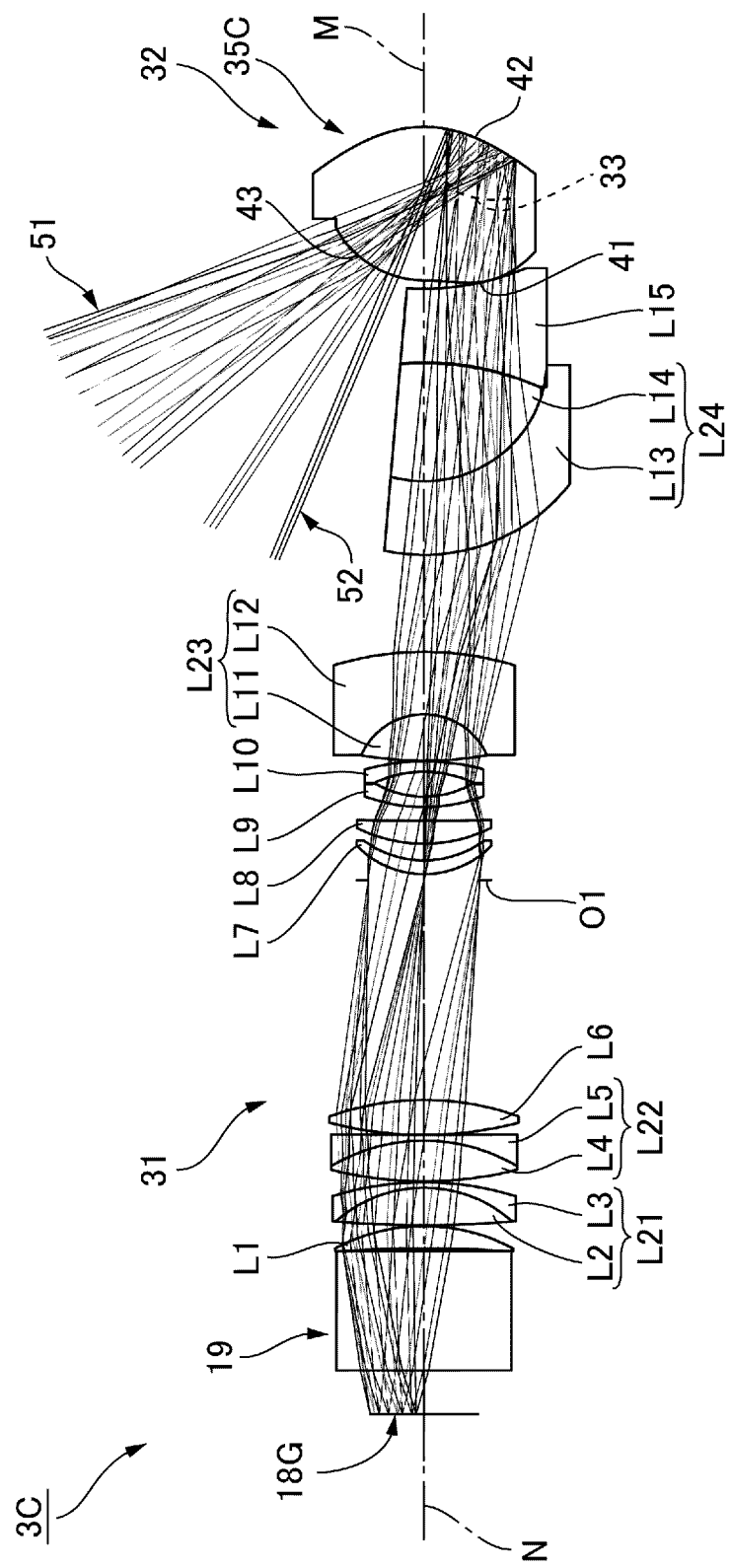
FIG. 15 is a light ray diagram of a projection system according to Example 3.
Figure 16:
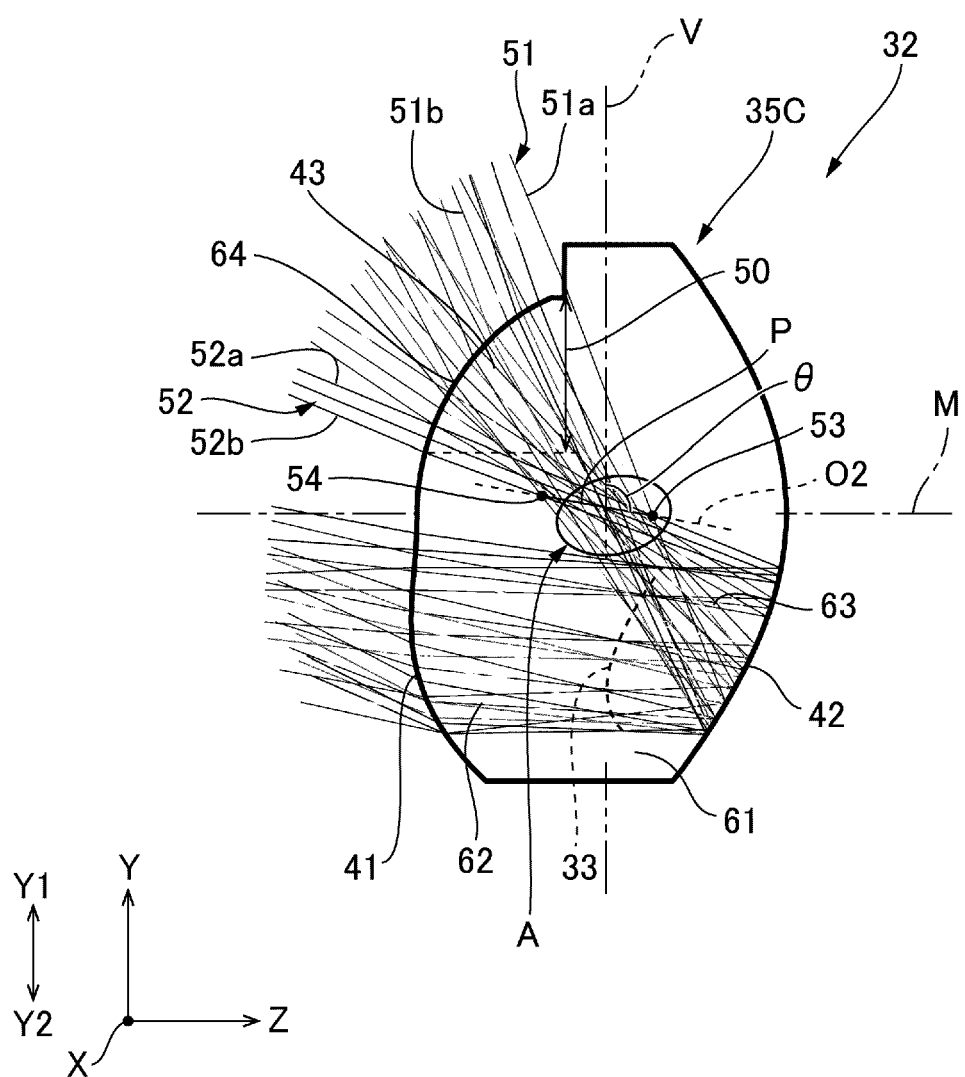
FIG. 16 is a light ray diagram of a second optical system in Example 3.
Figure 17:
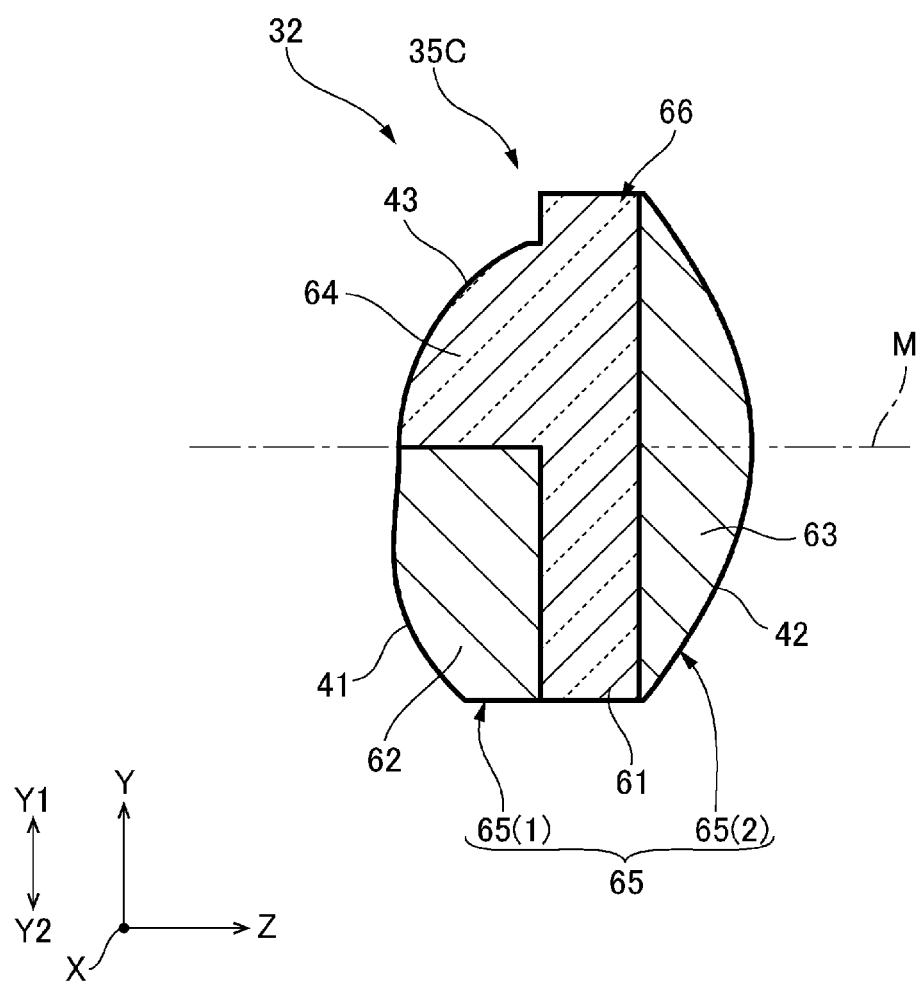
FIG. 17 describes the materials of optical elements that form the second optical system in Example 3.

FIG. 15 is a light ray diagram of a projection system according to Example 3. FIG. 16 is a light ray diagram of the second optical system. FIG. 17 describes the materials of optical elements that form the second optical system. A projection system 3C according to the present example is formed of the first optical system 31 and the second optical system 32 sequentially arranged from the demagnifying side toward the magnifying side, as shown in FIG. 15. The projection system 3C forms the intermediate image 33 in a position between the demagnifying-side image formation plane and the magnifying-side image formation plane of the projection system 3C, as shown in FIGS. 15 and 16. In the present example, the intermediate image 33 is formed in the second optical system 32. It is noted that the intermediate image 33 may not be formed in the second optical system 32. The first optical system 31 in some cases includes no cross dichroic prism 19. The projection system 3C has a configuration corresponding to the projection system 3A according to Example 1, and the corresponding components therefore have the same reference characters and will not be described.

The first optical system 31 is a refractive optical system including a plurality of lenses. In the present example, the first optical system 31 includes 15 lenses. The second optical system 32 is formed of 1 optical element 35C. The intermediate image 33 is formed in the optical element 35C.

Also in the optical element 35C, the four areas, the first area 61, the second area 62, the third area 63, and the fourth area 64, can be defined along the optical path of the light rays passing through the optical element 35C, as shown in FIG. 17. The first area 61 is located between the first transmissive surface 41 and the reflective surface 42 in the axis-Z direction and between the reflective surface 42 and the second transmissive surface 43 in the axis-Z direction. The first area 61 has a fixed thickness in the axis-Z direction. In the present example, the first area 61 has a disc-like shape. The intermediate image 33 is formed in the optical element 35C. At least part of the area A, where the diameter of the light flux formed of the light rays having entered the optical element 35C is minimized, is in the first area 61, as shown in FIG. 16. The second area 62 is adjacent to one side of the first area 61 on the lower side Y2 of the imaginary axis M. The second area 62 has the first transmissive surface 41. The third area 63 is located at a side of the first area 61 that is the side opposite the second area 62 on the lower side Y2 of the imaginary axis M. The third area 63 and the first area 61 are adjacent to each other in the axis-Z direction. The third area 63 has the reflective surface 42. The second area 62 and the third area 63 sandwich the first area 61 on the opposite sides in the axis-Z direction. The fourth area 64 is adjacent to the one side of the first area 61 on the upper side Y1 of the imaginary axis M. The fourth area 64 is further adjacent to the upper side Y1 of the second area 62. The fourth area 64 has the second transmissive surface 43.

In the present example, the second area 62 and the third area 63 are each made of resin. That is, the second area 62 and the third area 63 of the optical element 35C form the first member section 65 made of resin, as shown in FIG. 17. On the other hand, the first area 61 and the fourth area 64 are each made of quartz glass. That is, the first area 61 and the fourth area 64 of the optical element 35C form the second member section 66 made of glass. The first member section 65 includes a first first member section 65(1) including the second area 62 and a second first member section 65(2) including the third area 63.

The first first member section 65(1) is in close contact with one side of the second member section 66 in the axis-Z direction, and the second first member section 65(2) is in close contact with the other side of the second member section 66 in the axis-Z direction. The shape of a joint surface of the first first member section 65(1) therefore conforms to the shape of a joint surface of the second member section 66 that is the surface bonded to the first first member section 65(1). The joint surface of the first first member section 65(1) and the joint surface of the second member section 66 that is the surface bonded to the first first member section 65(1) are each a flat surface. The shape of a joint surface of the second member section 66 that is the surface bonded to the second first member section 65(2) conforms to the shape of a joint surface of the second first member section 65(2). The joint surface of the second member section 66 that is the surface bonded to the second first member section 65(2) and the joint surface of the second first member section 65(2) are each a flat surface.

The second member section 66 is made of glass and is therefore unlikely to generate heat and has high heat resistance as compared with the first member section 65 made of resin. The optical element 35C is in some cases provided with the stop O2, as indicated by the broken line in FIG. 16. The stop O2 is provided, for example, by dividing the optical element 35C along the imaginary line P, applying black ink for light blocking purposes onto the division surfaces, and then bonding the divided pieces of the optical element 35C to each other into the single optical element 35C. The stop O2 only needs to be formed by using a member capable of blocking part of the light flux that passes through the optical element 35C and is not necessarily formed by using black ink.

Lens Data

Data on the lenses of the projection system 3C are as follows: The surfaces of the lenses are numbered sequentially from the demagnifying side toward the magnifying side. A surface having a surface number with * is an aspheric surface. The surface number 1 represents the liquid crystal panel 18 and the demagnifying-side image formation plane. The surface number 2 represents the demagnifying-side surface of the cross dichroic prism 19, and the surface number 3 represents the magnifying-side surface thereof. The fields labeled with the surface number 21 show dummy data. The reference characters given to the first optical system 31 are the reference characters of the lenses thereof.

The reference characters given to the second optical system 32 represent the first transmissive surface 41, the reflective surface 42, the second transmissive surface 43, the first first member section 65(1), the second member section 66, and the second first member section 65(2). That is, the surface number 32 represents the first transmissive surface 41. The surface number 33 represents the bonding surface at which the first first member section 65(1) and the second member section 66 are bonded to each other. The surface number 35 represents the reflective surface 42. The surface number 36 represents the bonding surface at which the second first member section 65(2) and the second member section 66 are bonded to each other. The surface number 37 represents an imaginary boundary plane between the first area 61 and the fourth area 64. The surface number 38 represents the second transmissive surface 43. The surface numbers 33, 34, 36, and 37 each represent a surface having a planar shape. Reference character r denotes the radius of curvature in millimeters. Reference character d denotes the on-axis inter-surface distance in millimeters. Reference character nd denotes the refractive index. Reference character vd denotes the Abbe number. Reference character E denotes the effective radius.

| Surface number | Reference character | r | d | nd.vd | E |
|---|---|---|---|---|---|
| 1 | 18 | 1.000000E+18 | 7.125000E+00 | | |
| 2 | 19 | 1.000000E+18 | 1.943250E+01 | SBSL7_OHARA | 10.2460 |
| 3 | | 1.000000E+18 | 4.691589E−01 | | 12.9995 |
| 4 | L1 | −1.812632E+02 | 3.609720E+00 | 833122.4287 | 13.0000 |
| 5 | | −2.989524E+01 | 1.500000E−01 | | 13.2104 |
| 6 | L2 | 1.706382E+02 | 6.085524E+00 | 455055.8550 | 13.1558 |
| 7 | L3 | −2.108995E+01 | 9.000000E−01 | 845501.2485 | 13.1217 |
| 8 | | −4.926623E+01 | 1.500000E−01 | | 13.6111 |
| 9 | L4 | 5.976424E+01 | 6.647001E+00 | SBSL7_OHARA | 13.6591 |
| 10 | L5 | −2.903433E+01 | 9.000000E−01 | TAFD25_HOYA | 13.5651 |
| 11 | | 1.392889E+03 | −2.091294E−17 | | 13.8433 |
| 12 | L6 | 5.881683E+01 | 5.696279E+00 | 444740.8584 | 14.0604 |
| 13 | | −4.445917E+01 | 3.583482E+01 | | 14.0835 |
| 14 | stop | 1.000000E+18 | 9.635853E−01 | | 9.0000 |
| 15 | L7 | 1.495582E+01 | 2.244218E+00 | 438075.9368 | 9.8959 |
| 16 | | 1.616764E+01 | 2.714631E+00 | | 9.6532 |
| 17 | L8 | 2.400762E+01 | 3.726822E+00 | 846663.2378 | 9.8467 |
| 18 | | 5.358274E+02 | 2.255573E+00 | | 9.6049 |
| 19 | L9 | 2.728590E+01 | 1.700000E+00 | 755000.5232 | 8.6954 |
| 20 | | 1.576844E+01 | 2.183000E+00 | | 8.0001 |
| 21 | dummy | 1.000000E+18 | 1.822460E+00 | | 8.0000 |
| 22 | L10 | −1.849842E+01 | 1.700000E+00 | 834805.4272 | 8.0003 |
| 23 | | −3.615641E+01 | 1.000000E−01 | | 8.6740 |
| 24 | L11 | 5.735115E+01 | 7.577326E+00 | 576367.4539 | 9.2374 |
| 25 | L12 | −1.098129E+01 | 1.016853E+01 | 846110.2428 | 9.4137 |
| 26 | | −4.957545E+01 | 1.579306E+01 | | 13.4811 |
| 27 | L13 | 2.961997E+01 | 1.200000E+01 | 523929.4689 | 22.0747 |
| 28 | L14 | 1.979866E+01 | 1.921839E+01 | 540746.6929 | 18.8332 |
| 29 | | −4.643698E+01 | 1.485181E−01 | | 18.4518 |
| 30 | L15 | −4.486200E+01 | 1.200000E+01 | 809560.3393 | 18.4495 |
| 31 | | 4.185301E+01 | 1.353667E+00 | | 16.4364 |
| 32* | 41 | −3.056962E+01 | 1.000000E+01 | E48R_ZEON | 16.6729 |
| 33 | 66 | 1.000000E+18 | 7.000000E+00 | 525326.7170 | 15.3310 |
| 34 | 65 (2) | 1.000000E+18 | 8.000000E+00 | E48R_ZEON | 14.6819 |
| 35* | 42 | −1.847144E+01 | −8.000000E+00 | E48R_ZEON | 14.7923 |
| 36 | 66 | 1.000000E+18 | −7.000000E+00 | 525326.7170 | 10.3444 |
| 37 | | 1.000000E+18 | −1.000000E+01 | 525326.7170 | 28.7306 |
| 38* | 43 | 1.537007E+01 | −2.900000E+02 | | 15.3409 |
| 39 | S | 1.000000E+18 | | | 870.0402 |

Data on the aspheric surfaces labeled with the surface numbers 32, 35, and 38 are as follows.

| Surface number | 32 | 35 | 38 |
|---|---|---|---|
| Radius of curvature in the axis-Y direction | −30.56961551 | −18.47143653 | 15.3700684 |

-continued

| Surface number | 32 | 35 | 38 |
|---|---|---|---|
| Conic constant (K) | 0 | −1 | 0 |
| Fourth-order coefficient (A) | 0.000201869 | 1.64149E−05 | −1.05561E−05 |
| Sixth-order coefficient (B) | −5.54505E−07 | −8.59042E−08 | −9.8238E−08 |
| Eighth-order coefficient (C) | 1.00734E−09 | 6.00656E−10 | 5.0539E−10 |
| Tenth-order coefficient (D) | −7.83761E−13 | −2.76177E−12 | −1.07879E−12 |
| Twelfth-order coefficient (E) | 0 | 7.88392E−15 | 0 |
| Fourteenth-order coefficient (F) | 0 | −9.87253E−18 | 0 |
| Sixteenth-order coefficient (G) | 0 | 0 | 0 |
| Eighteenth-order coefficient (H) | 0 | 0 | 0 |

Effects

In the projection system. 3C according to the present example, the optical element 35C, which forms the second optical system 32, has the reflective surface 42 having a concavely curved shape and the second transmissive surface 43 having a convexly curved shape and protruding toward the magnifying side. The optical element 35C therefore allows the light flux reflected off the reflective surface 42 to be refracted by the second transmissive surface 43. The focal length, that is, the projection distance of the projection system 3C is therefore readily shortened as compared with a second optical system 32 having only the reflective surface 42. Further, since the optical element 35C has the second transmissive surface 43 having a convexly curved shape and protruding toward the magnifying side, an increase in the size of the reflective surface 42, which is disposed on the magnifying side of the intermediate image 33 and having a concavely curved shape, can be suppressed even in the case of a short projection distance.

Further, in the present example, the intermediate image 33 is located in the optical element 35C and between the first transmissive surface 41 and the reflective surface 42. The first optical system 31 can therefore be closer to the optical element 35C than in a case where the intermediate image 33 is formed in a position between the first optical system 31 and the optical element 35C. The projection system 3C can therefore be compact.

In the present example, the first transmissive surface 41, the reflective surface 42, and the second transmissive surface 43 of the second optical system 32 are each an aspheric surface. Aberrations produced by the projection system 3C according to the present example can therefore be suppressed.

Further, in the present example, since the first transmissive surface 41, which is adjacent to the intermediate image 33 on the demagnifying side, is an aspheric surface, aberrations of the intermediate image 33 can be suppressed. Moreover, in the present example, the intermediate image 33 does not greatly incline along the imaginary axis M, and the intermediate image 33 extends in the direction perpendicular to the imaginary axis M. The first transmissive surface 41 and the intermediate image 33 are therefore readily allowed to approach each other in the axis-Z direction, whereby the aspheric surface can be disposed in a position close to the intermediate image 33. Aberrations of the intermediate image 33 can therefore be efficiently corrected.

In the present example, since the imaginary line P inclines with respect to the imaginary vertical line V, the lower-end light flux 52 passing through the lower end of the effective light ray range 50 of the second transmissive surface 43 is not blocked but is allowed to reach the screen S.

Further, in the present example, since the imaginary line P inclines with respect to the imaginary vertical line V, a decrease in the amount of light at the upper periphery of the screen S can be suppressed, as compared with a case where the imaginary line P is parallel to the imaginary vertical line V. Moreover, when the divergence angle θ0 of the light flux that reaches the upper portion of the screen S increases, the difference between the divergence angle θ0 of the light flux that reaches the upper portion of the screen S and the divergence angle θ0 of the light flux that reaches the lower portion of the screen S decreases. A decrease in the amount of light at the upper periphery of the screen S compared with the amount of light at the lower periphery of the screen S can therefore be suppressed.

Further, in the present example, the inclination angle by which the imaginary line P inclines with respect to the imaginary vertical line V is greater than or equal to 90°. The divergence angle θ0 of the light flux that reaches the lower portion of the screen S therefore decreases. The difference in the divergence angle θ0 between the light flux that reaches the upper portion of the screen S and the light ray that reaches the lower portion of the screen S therefore decreases, whereby the difference in the amount of light between the upper portion and the lower portion of the screen S can be suppressed.

In the present example, the optical element 35C includes the first member section 65 made of resin and the second member section 66 made of glass arranged along the optical path of the light rays passing through the optical element 35C. The area A, where the diameter of the light flux formed of the light rays having entered the optical element 35C is minimized, is located in the second member section 66. To this end, the area A, which is likely to be heated due to the increase in the optical density in the optical element 35C, is made of a material having high heat resistance. The situation in which the heated portion of the optical element 35C undergoes thermal expansion and therefore causes degradation in optical performance of the projection system 3C can therefore be suppressed or avoided.

Further, since the intermediate image 33 is formed in the second member section 66, the intermediate image 33 does not cross the bonding surface at which the first member section 65 and the second member section 66 are bonded to each other. The configuration described above can avoid degradation of a projection image resulting from the bonding surface at which the first member section 65 and the second member section 66 are bonded to each other.

Further, the second area 62 having the aspheric first transmissive surface 41 and the third area 63 having the aspheric reflective surface 42 are each made of resin. The optical element 35C is therefore readily provided with the aspheric first transmissive surface 41 and the aspheric reflective surface 42, as compared with an optical element 35C including the second area 62 and the third area 63 each made of glass.

Figure 18:
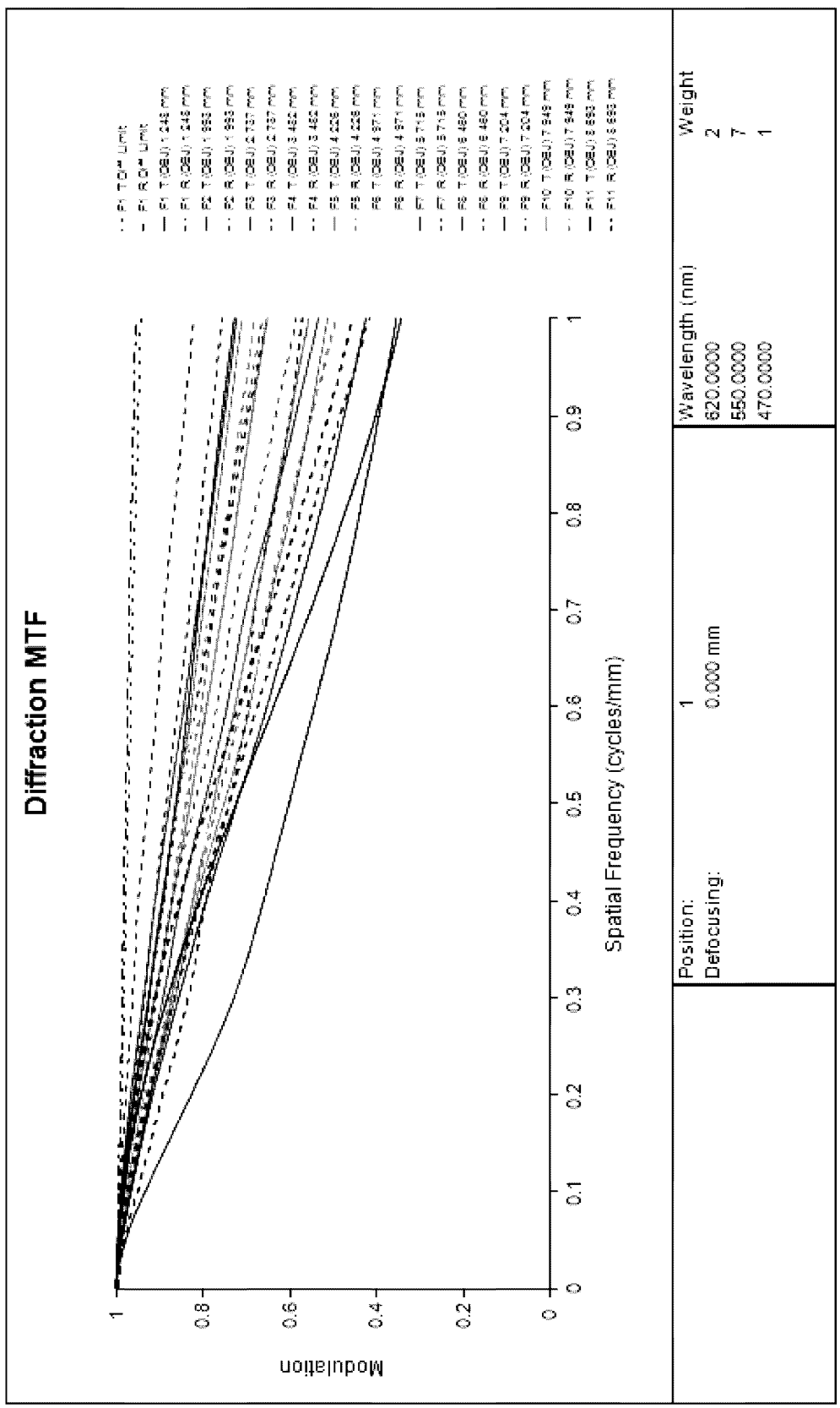
FIG. 18 shows the magnifying-side MTF of the projection system according to Example 3.

FIG. 18 shows the magnifying-side MTF of the projection system 3C. The horizontal axis of FIG. 18, which shows the MTF, represents the spatial frequency. The vertical axis of FIG. 18 represents a contrast reproduction ratio. In the present example, a decrease in resolution is suppressed, as shown in FIG. 18.

Other Embodiments

Figure 19:
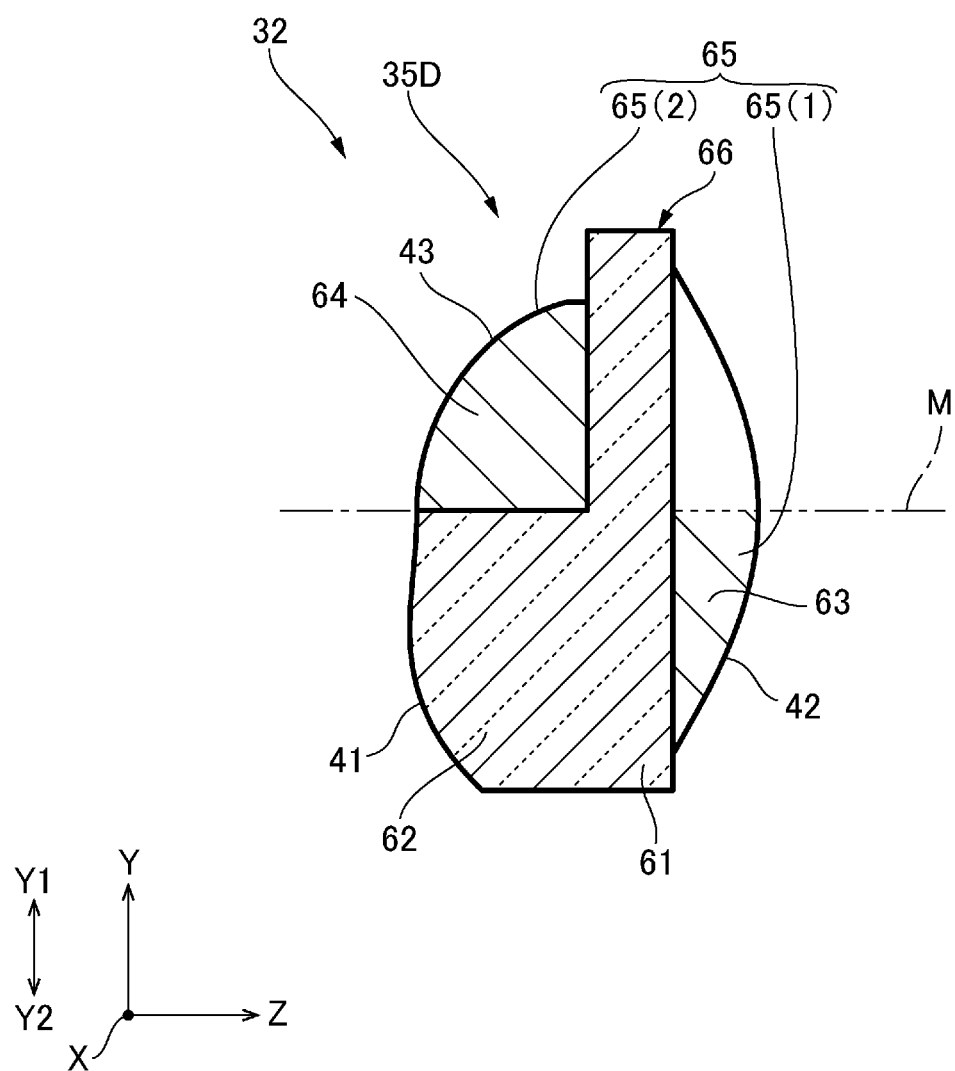
FIG. 19 describes a variation of the optical element.

FIG. 19 shows a variation of the optical element 35 employable in the second optical system 32 of the projection system 3. In an optical element 35D in the variation shown in FIG. 19, the first area 61 and the second area 62 form the second member section 66 made of glass, and the third area 63 and the fourth area 64 form the first member section 65 made of resin. The first member section 65 includes a first first member section 65(1) having the third area 63 and a second first member section 65(2) having the fourth area 64.

The configuration described above also allows the area where the diameter of the light flux formed of the light rays having entered the optical element 35D is minimized to be located in the second member section 66. The area that is likely to be heated due to the increase in the optical density in the optical element 35D is therefore made of a material having high heat resistance. The situation in which the heated portion of the optical element 35D undergoes thermal expansion and therefore causes degradation in optical performance of the projection system can therefore be suppressed or avoided.

To configure an imaging apparatus by using the projection system 3, an imaging device 100 is disposed in the demagnifying-side image formation plane of the projection system 3, as shown in FIG. 2.

What is claimed is:

1. A projection system comprising:
a first optical system; and
a second optical system arranged on a magnifying side of the first optical system,
wherein the projection system forms an intermediate image in a position between a demagnifying-side image formation plane and a magnifying-side image formation plane of the projection system,
the second optical system is an optical element having a first transmissive surface, a reflective surface, and a second transmissive surface arranged from a demagnifying side toward the magnifying side,
the first transmissive surface and the reflective surface are located at one side with respect to an optical axis,
the second transmissive surface is located at another side with respect to the optical axis,
the reflective surface has a concavely curved shape,
the second transmissive surface has a convexly curved shape protruding toward the magnifying side,
the optical element includes a first member made of a first material and a second member made of a second material different from the first material, and
the intermediate image is formed in the second member.

2. The projection system according to claim 1, wherein the intermediate image is located between the first transmissive surface and the reflective surface of the optical element.

3. The projection system according to claim 1,
wherein three axes perpendicular to one another are called axes X, Y, and Z, with an axis-Z direction being a direction in which the optical axis extends, an upper side being one side of the axis Y, a lower side being another side of the axis Y, and a plane YZ being a plane perpendicular to the axis X and containing the axes Y and Z,
an imaginary line that connects an upper intersection to a lower intersection inclines with respect to an imaginary vertical line perpendicular to the optical axis in the plane YZ, the upper intersection being an intersection where an upper peripheral light ray of an upper-end light flux that is a light ray passing through an axis-Y-direction upper end of an effective range of the second transmissive surface and an upper peripheral light ray of a lower-end light flux that is a light ray passing through an axis-Y-direction lower end of the effective range intersect with each other in the plane YZ, and the lower intersection being an intersection where a lower peripheral light ray of the upper-end light flux and a lower peripheral light ray of the lower-end light flux intersect with each other in the plane YZ.

4. The projection system according to claim 1, wherein a pupil is located in the optical element and inclines with respect to a plane perpendicular to the optical axis.

5. The projection system according to claim 1, wherein the second member is made of glass.

6. The projection system according to claim 1, wherein the first member is made of resin.

7. The projection system according to claim 1, wherein bonding surfaces of the first member and the second member have shapes corresponding to each other.

8. The projection system according to claim 1, wherein at least one of the first transmissive surface, the reflective surface, and the second transmissive surface is an aspheric surface.

9. The projection system according to claim 1, wherein the first optical system is a refractive optical system.

10. A projection-type image display apparatus comprising:
the projection system according to claim 1; and
an image formation section that forms a projection image in the demagnifying-side image formation plane.

11. An imaging apparatus comprising:
the projection system according to claim 1; and
an imaging device disposed in the demagnifying-side image formation plane.

12. A projection-type image display apparatus comprising:
the projection system according to claim 2; and
an image formation section that forms a projection image in the demagnifying-side image formation plane.

13. An imaging apparatus comprising:
the projection system according to claim 2; and
an imaging device disposed in the demagnifying-side image formation plane.

14. A projection system comprising:
a first optical system; and
a second optical system arranged on a magnifying side of the first optical system,
wherein the projection system forms an intermediate image in a position between a demagnifying-side image formation plane and a magnifying-side image formation plane of the projection system,
the second optical system is an optical element having a first transmissive surface, a reflective surface, and a second transmissive surface arranged from a demagnifying side toward the magnifying side,
the first transmissive surface and the reflective surface are located at one side with respect to an optical axis,
the second transmissive surface is located at another side with respect to the optical axis,
the reflective surface has a concavely curved shape,
the second transmissive surface has a convexly curved shape protruding toward the magnifying side,
the optical element includes a first member made of a first material and a second member made of a second material different from the first material,
the second member excels the first member in heat resistance, and
the second member is disposed on at least part of an area where a diameter of a light flux entered the optical element is minimized.

15. A projection system comprising:
a first optical system; and
a second optical system arranged on a magnifying side of the first optical system,
wherein the projection system forms an intermediate image in a position between a demagnifying-side image formation plane and a magnifying-side image formation plane of the projection system,
the second optical system is an optical element having a first transmissive surface, a reflective surface, and a second transmissive surface arranged from a demagnifying side toward the magnifying side,
the first transmissive surface and the reflective surface are located at one side with respect to an optical axis,
the second transmissive surface is located at another side with respect to the optical axis,
the reflective surface has a concavely curved shape,
the second transmissive surface has a convexly curved shape protruding toward the magnifying side,
the optical element includes a first member made of a first material and a second member made of second material different from the first material, the second member excels the first member in transmittance of light rays, and the second member is disposed on at least part of an area where a diameter of a light flux entered the optical element is minimized.

16. A projection system comprising:

a first optical system; and a second optical system arranged on a magnifying side of the first optical system, wherein the projection system forms an intermediate image in a position between a demagnifying-side image formation plane and a magnifying-side image formation plane of the projection system, the second optical system is an optical element having a first transmissive surface, a reflective surface, and a second transmissive surface arranged from a demagnifying side toward the magnifying side, the first transmissive surface and the reflective surface are located at one side with respect to an optical axis, the second transmissive surface is located at another side with respect to the optical axis, the reflective surface has a concavely curved shape, the second transmissive surface has a convexly curved shape protruding toward the magnifying side, the optical element includes a first member made of a first material and a second member made of a second material different from the first material, and the first transmissive surface is provided with the first member, the reflective surface is provided with the first member, and the second transmissive surface is provided with the first member.

17. A projection system comprising:

a first optical system; and a second optical system arranged on a magnifying side of the first optical system, wherein the projection system forms an intermediate image in a position between a demagnifying-side image formation plane and a magnifying-side image formation plane of the projection system, the second optical system is an optical element having a first transmissive surface, a reflective surface, and a second transmissive surface arranged from a demagnifying side toward the magnifying side, the first transmissive surface and the reflective surface are located at one side with respect to an optical axis, the second transmissive surface is located at another side with respect to the optical axis, the reflective surface has a concavely curved shape, the second transmissive surface has a convexly curved shape protruding toward the magnifying side, the optical element includes a first member made of a first material and a second member made of a second material different from the first material, the first transmissive surface is provided with the first member, the second transmissive surface is provided with the first member, and the reflective surface is provided with the second member.

18. A projection system comprising:

a first optical system; and a second optical system arranged on a magnifying side of the first optical system, wherein the projection system forms an intermediate image in a position between a demagnifying-side image formation plane and a magnifying-side image formation plane of the projection system, the second optical system is an optical element having a first transmissive surface, a reflective surface, and a second transmissive surface arranged from a demagnifying side toward the magnifying side, the first transmissive surface and the reflective surface are located at one side with respect to an optical axis, the second transmissive surface is located at another side with respect to the optical axis, the reflective surface has a concavely curved shape, the second transmissive surface has a convexly curved shape protruding toward the magnifying side, the optical element includes a first member made of a first material and a second member made of a second material different from the first material, the first transmissive surface is provided with the first member, the reflective surface is provided with the first member, and the second transmissive surface is provided with the second member.

19. A projection system comprising:

a first optical system; and a second optical system arranged on a magnifying side of the first optical system, wherein the projection system forms an intermediate image in a position between a demagnifying-side image formation plane and a magnifying-side image formation plane of the projection system, the second optical system is an optical element having a first transmissive surface, a reflective surface, and a second transmissive surface arranged from a demagnifying side toward the magnifying side, the first transmissive surface and the reflective surface are located at one side with respect to an optical axis, the second transmissive surface is located at another side with respect to the optical axis, the reflective surface has a concavely curved shape, the second transmissive surface has a convexly curved shape protruding toward the magnifying side, the optical element includes a first member made of a first material and a second member made of a second material different from the first material, and the optical element includes a stop on a further magnifying side than the reflective surface.

20. A projection system comprising:

a first optical system; and a second optical system arranged on a magnifying side of the first optical system, wherein the projection system forms an intermediate image in a position between a demagnifying-side image formation plane and a magnifying-side image formation plane of the projection system, the second optical system is an optical element having a first transmissive surface, a reflective surface, and a second transmissive surface arranged from a demagnifying side toward the magnifying side, the first transmissive surface and the reflective surface are located at one side with respect to an optical axis, the second transmissive surface is located at another side with respect to the optical axis, the reflective surface has a concavely curved shape, the second transmissive surface has a convexly curved shape protruding toward the magnifying side, the optical element includes a first member made of a first material and a second member made of a second material different from the first material, and at least a portion of the second member is sandwiched between two portions of the first member.

* * * * *